United States Patent [19]
Ishibe et al.

[11] Patent Number: 6,067,106
[45] Date of Patent: May 23, 2000

[54] SCANNING OPTICAL APPARATUS

[75] Inventors: Yoshihiro Ishibe; Kazuo Fujibayashi, both of Kawasaki; Koji Hoshi, Yokohama, all of Japan

[73] Assignee: Canon Kabushiki Kaisha, Tokyo, Japan

[21] Appl. No.: 09/059,250

[22] Filed: Apr. 14, 1998

[30] Foreign Application Priority Data

Apr. 16, 1997 [JP] Japan .................................... 9-114284
May 28, 1997 [JP] Japan .................................... 9-154461

[51] Int. Cl.[7] .................................................. G02B 26/10

[52] U.S. Cl. .......................... 347/258; 347/241; 347/244; 359/206; 359/569

[58] Field of Search ..................................... 347/241, 244, 347/256, 258; 430/321; 359/206, 207, 563, 568, 569, 637, 662

[56] References Cited

U.S. PATENT DOCUMENTS

| 4,895,790 | 1/1990 | Swanson et al. ...................... 430/321 |
| 5,486,694 | 1/1996 | Harris .................................... 250/236 |

FOREIGN PATENT DOCUMENTS

| 0 827 004 | 3/1998 | European Pat. Off. ........ G02B 26/10 |
| 3-125111 | 5/1991 | Japan . |
| 10-68903 | 3/1998 | Japan ............................. G02B 26/10 |

*Primary Examiner*—N. Le
*Assistant Examiner*—Hai C. Pham
*Attorney, Agent, or Firm*—Fitzpatrick, Cella, Harper & Scinto

[57] ABSTRACT

A scanning optical apparatus includes a light source, deflector for deflecting a light beam emitted from the light source, and optical device for directing the light beam emitted from the light source onto a surface to be scanned. The optical device includes a diffracting optical element. An aberration fluctuation in a sub-scanning direction resulting from environmental fluctuation of the scanning optical apparatus is corrected by the characteristic of the optical device.

70 Claims, 13 Drawing Sheets

(WAVELENGTH)

SCANNING OPTICAL APPARATUS

BACKGROUND OF THE INVENTION

1. Field of the Invention

This invention relates to a scanning optical apparatus and an image forming apparatus using the same. The invention is particularly suitable for an image forming apparatus such as a laser beam printer (LBP) or a digital copying apparatus suited for highly minute printing in which a diffraction optical element is provided in at least one of a first optical system disposed on a light source means side relative to a light deflector and a second optical system disposed on a surface to be scanned side, whereby an aberration fluctuation (a change in focus) does not occur even if an environmental fluctuation (particularly a temperature change) occurs to the apparatus.

2. Related Background Art

Heretofore, in a scanning optical apparatus used in a laser beam printer or a digital copying apparatus or the like, a light beam light-modulated and emitted from light source means in conformity with an image signal has been periodically deflected by a light deflector comprising, for example, a rotatable polygon mirror, and has been converged into a spot-like shape on a photosensitive recording medium (photosensitive drum) by a scanning optical element (imaging element) having the fθ characteristic, and has optically scanned the surface thereof to thereby effect image recording.

A scanning optical apparatus of this kind in which a diffraction optical element is applied to the scanning optical system thereof is proposed, for example, in Japanese Laid-Open Patent Application No. 3-125111. In this publication, the optical system is comprised of a holographic fθ lens having power only in a main scanning direction, and a cylindrical lens having power in a sub-scanning direction. The correction of the fθ characteristic and surface inclination and the separation of first-order diffracted light and diffracted lights of other orders are effected.

Also, U.S. Pat. No. 5,486,694 discloses a scanning optical system having a surface inclination correcting effect in which a diffracting surface is provided on a toric lens.

However, the cylindrical lens in Japanese Laid-Open Patent Application No. 3-125111, when it is formed of a glass material, is more advantageous in cost than a conventional fθ lens comprising a combination of a plurality of lenses, but the cylindrical lens of a glass material is still expensive as compared with plastic lenses. On the other hand, if a cylindrical lens is formed of a plastic material to reduce the cost thereof, defocus in the sub-scanning direction is caused by an environmental fluctuation, particularly, a temperature change. To prevent this, the cylindrical lens can be brought close to a scanned surface, but if this done, the cylindrical lens will become large and as the result, the entire apparatus will become bulky, and this leads to the problem that the cost becomes high.

U.S. Pat. No. 5,486,694 suffers from the problem that no consideration is paid to the deterioration of aberrations caused by a change in the angle of diffraction due to the fluctuation of the wavelength of a laser beam.

On the other hand, in a scanning optical element (fθ lens) in a scanning optical system, the mainstream is to use a plastic lens in order to meet the requirements for lower costs and compactness.

FIG. 1 of the accompanying drawings is a schematic view of the essential portions of a scanning optical apparatus of this kind according to the prior art. In FIG. 1, a divergent light beam emitted from light source means 81 is made into a substantially parallel light beam by a collimator lens 82, and this light beam (the quantity of light) is limited by a stop 83 and enters a cylindrical lens 84 having a predetermined refractive power only in a sub-scanning direction. That part of the parallel light beam having entered the cylindrical lens 84 which is in a main scanning cross-section emerges intactly as a parallel light beam. Also, that part of the parallel light beam which is in a sub-scanning cross-section is converged and imaged substantially as a linear image on the deflecting surface (reflecting surface) 85a of a light deflector 85 comprising a rotatable polygon mirror. Here, the main scanning cross-section refers to a light beam cross-section formed with the lapse of time by a light beam deflected and reflected by the deflecting surface of the light deflector. Also, the sub-scanning cross-section refers to a cross-section containing the optical axis of an fθ lens and orthogonal to the main scanning cross-section.

The light beam deflected by the deflecting surface of the light deflector 85 is directed onto a photosensitive drum surface 87 as a surface to be scanned through a scanning optical element (fθ lens) 86 having the fθ characteristic, and the light deflector 85 is rotated in the direction of arrow A, thereby optically scanning the photosensitive drum surface 87 in the direction of arrow B. Thereby, image recording is effected on the photosensitive drum surface 87 which is a recording medium. Each of the collimator lens 82, the stop 83 and the cylindrical lens 84 constitutes an element of a first optical system $L_{S1}$, and the fθ lens 86 constitutes an element of a second optical system $L_{S2}$.

In the scanning optical apparatus of this kind, it is often the case that, as previously described, in order to meet requirements for the lower costs and compactness of the fθ lens, the fθ lens is comprised of only a plastic lens of an aspherical shape. The plastic material, however, has the nature that the refractive index thereof changes with the fluctuation of its environment of use (particularly, the fluctuation of temperature) and therefore, in a scanning optical apparatus using an fθ lens comprising the plastic lens, a change in focus is caused by the environmental fluctuation. Under the existing circumstances, the amount of focus fluctuation is set to such a degree that will not affect the actual image and therefore there arises no problem. When it is desired to step down the spot diameter of a condensed beam on the scanned surface for the purpose of more highly minute printing or when an attempt is made to bring an fθ lens close to the light deflector in an attempt to downsize the fθ lens for the purpose of lower cost and compactness, there is the problem that the above-mentioned focus fluctuation, particularly, focus fluctuation in the sub-scanning direction, cannot be allowed.

SUMMARY OF THE INVENTION

It is the object of the present invention to provide a compact scanning optical apparatus suited for highly minute printing in which aberration fluctuation (a change in focus) does not occur even if environmental fluctuations (temperature change and wavelength change of light source means) occur to the apparatus, and an image forming apparatus using the same.

The scanning optical apparatus of the present invention is comprised of:

light source means;

deflecting means for deflecting a light beam emitted from said light source means; and optical means having a diffracting optical element for directing the light beam emitted from said light source means onto a surface to be scanned;

and is characterized in that an aberration fluctuation in a sub-scanning direction resulting from the environmental fluctuations of said scanning optical apparatus is corrected by the characteristic of said optical means.

Particularly, it is characterized in that said characteristic is the relation between the power of the diffracting optical element in said optical means and the other power than that of said diffracting optical element in said optical means, said characteristic is the power ratio between the diffracting portion and refracting portion of said optical means, and said environmental fluctuations are a temperature fluctuation and the wavelength fluctuation of said light source means.

Also, it is characterized in that said light source means is a semiconductor laser, and said aberration fluctuation is a focus fluctuation.

Particularly, it is characterized in that said optical means comprises a first optical system for directing the light beam emitted from said light source means to said deflecting means, and a second optical system for directing the light beam deflected by said deflecting means to said surface to be scanned, said diffracting optical element is provided in said first optical system, or said diffracting optical element is provided on at least one surface of an optical element constituting said first optical system.

Also, it is characterized in that said optical means comprises a first optical system for directing the light beam emitted from said light source means to said deflecting means, and a second optical system for directing the light beam deflected by said deflecting means to said surface to be scanned, said diffracting optical element is provided in said second optical system, said diffracting optical element is provided on at least one surface of an optical element constituting said second optical system, said second optical system has a single lens formed of a plastic material, and said diffracting optical element, said diffracting optical element is added to at least one surface of said single lens, said single lens has its opposite lens surfaces in a main scanning direction formed into an aspherical shape, said single lens differs in refractive power between the main scanning direction and the sub-scanning direction, and when the power of the diffracting optical element in said second optical system is $\phi B$ and the other power than that of said diffracting optical element is $\phi L$, the condition that $$1.0 \leq \phi L/\phi B \leq 2.6$$

is satisfied.

Particularly, it is characterized in that said optical means comprises a first optical system for directing the light beam emitted from said light source means to said deflecting means, and a second optical system for directing the light beam deflected by said deflecting means to said surface to be scanned, said diffracting optical element is provided in said first optical system and said second optical system, or said diffracting optical element is provided on at least one surface of an optical element constituting said first optical system and at least one surface of an optical element constituting said second optical system.

Also, the invention is characterized in that said diffracting optical element has its grating structure comprising a staircase-like optical element, or said diffracting optical element has its grating structure comprising a continuous Fresnel-like optical element.

Also, the image forming apparatus of the present invention is characterized in that it forms an image by the use of the scanning optical apparatus described above.

Also, the scanning optical apparatus of the present invention is characterized by being comprised of:

light source means;

deflecting mean for deflecting a light beam emitted from said light source means;

a first optical system having a first diffracting optical element for directing the light beam emitted from said light source means to said deflecting means; and a second optical system having a second diffracting optical element for directing the light beam deflected by said deflecting means to a surface to be scanned.

Particularly, it is characterized in that an aberration fluctuation resulting from the environmental fluctuations of said scanning optical apparatus is corrected by the characteristic of said first optical system or/and said second optical system, said characteristic is the relation between the power of the diffracting optical element in said first optical system or/and said second optical system and the other power than that of said diffracting optical element in said first optical system or/and said second optical system, and said environmental fluctuations are a temperature fluctuation and the wavelength fluctuation of said light source means.

Also, it is characterized in that said light source means is a semiconductor laser, and said aberration fluctuation is a focus fluctuation.

Particularly, it is characterized in that said first optical system comprises an anamorphic optical system for converting the light beam emitted from said light source means into a convergent light beam or a substantially parallel light beam in a main scanning direction, and causing said converted light beam to be imaged on the deflecting surface of said deflecting means in a sub-scanning direction, said first diffracting optical element is provided on at least one surface of an optical element constituting said first optical system, said second optical system comprises an anamorphic optical system for causing the light beam deflected by said deflecting means to be imaged in a spot-like shape on said surface to be scanned, said second diffracting optical element is provided on at least one surface of an optical element constituting said second optical system, at least one of said first diffracting optical element and said second diffracting optical element has diffracting action only in one of the main scanning direction and the sub-scanning direction, one of said first diffracting optical element and said second diffracting optical element has diffracting action only in the main scanning direction and the other diffracting optical element has diffracting action only in the sub-scanning direction, said second optical system has a single lens formed of a plastic material, said first diffracting optical element is provided on at least one surface of the optical element constituting said first optical system, said second diffracting optical element is provided on at least one surface of the optical element constituting said second optical system, and each of said first optical system and said second optical system has an anamorphic optical element.

Also, the invention is characterized in that said light source means can oscillate light beams of at least two different wavelengths $\lambda_1$ and $\lambda_2$, and satisfies the condition that $$-4.0 < \frac{\Delta P_1}{\Delta P_0 - \Delta P_1} < 0.0$$

where $\phi_1$ . . . the power of the first or second diffracting optical element for the wavelength $\lambda_1$ $\Delta P_0$ . . . the amount of focus change of the entire scanning optical apparatus when the wavelength of the light source means is changed from $\lambda_1$ to $\lambda_2$ $\Delta P_1$ . . . the focus position difference between a case where the power of the first or second diffracting optical element is calculated by $\phi_1$ when the wavelength of the light source means is $\lambda_1$ and a case where the power of the first or second diffracting optical element is calculated by $\phi_1 \cdot (\lambda_2/\lambda_1)$ when the wavelength of the light source means is $\lambda_2$, said light source means has the characteristic that the wavelength thereof changes from $\lambda_1$ to $\lambda_2$ when the used temperature of the scanning optical apparatus is changed from $T_1$ to $T_2$, and satisfies the condition that $$-4.0 < \frac{\Delta P_{1T}}{\Delta P_{0T} - \Delta P_{1T}} < 0.0,$$

where $\phi_1$ . . . the power of the first or second diffracting optical element for the wavelength $\lambda_1$ $\Delta P_{0T}$ . . . the amount of focus change of the entire scanning optical apparatus when the used temperature of the scanning optical apparatus is changed from $T_1$ to $T_2$ $\Delta P_{1T}$ . . . the focus position difference between a case where the power of the first or second diffracting optical element is calculated by $\phi_1$ when the used temperature of the scanning optical apparatus is $T_1$ and the wavelength of the light source means is $\lambda_1$ and a case where the power of the first or second diffracting optical element is calculated by $\phi_1 \cdot (\lambda_2/\lambda_1)$ when the used temperature of the scanning optical apparatus is $T_2$ and the wavelength of the light source means is $\lambda_2$.

Also, the image forming apparatus of the present invention is characterized in that it forms an image by the use of the scanning optical apparatus described above.

DESCRIPTION OF THE PREFERRED EMBODIMENTS

Figure 2:
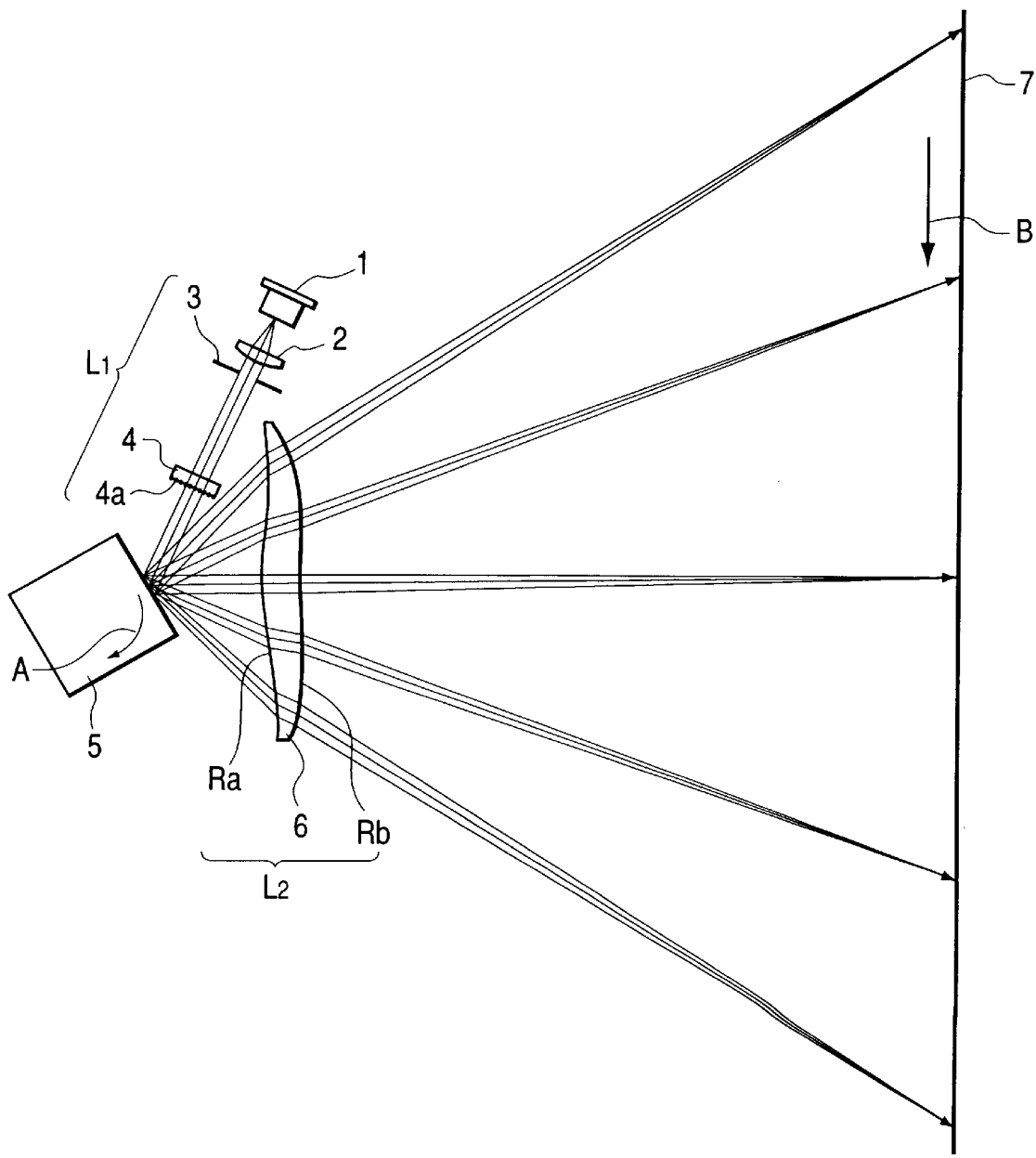
FIG. 2 is a cross-sectional view of the essential portions of Embodiment 1 of the scanning optical apparatus of the present invention in a main scanning direction.

FIG. 2 is a cross-sectional view of essential portions in a main scanning direction (main scanning cross-sectional view) when a scanning optical apparatus according to Embodiment 1 of the present invention is applied to an image forming apparatus such as a laser beam printer or a digital copying apparatus.

In FIG. 2, reference numeral 1 designates a light source means comprising, for example, a semiconductor laser. Reference numeral 2 denotes a collimator lens which converts a divergent light beam emitted from the light source means 1 into a substantially parallel light beam. Reference numeral 3 designates an aperture stop which limits the light beam passing therethrough (the quantity of light) and shapes its beam shape.

Reference numeral 4 denotes a diffracting optical element having a diffracting surface 4a added to a flat surface of the flat plate formed, for example, of a glass material or a plastic material which is adjacent to a light deflector 5 which will be described later. The diffracting optical element 4 has power (diffracting power) in a sub-scanning direction perpendicular to the plane of the drawing sheet of FIG. 2, and causes the light beam passed through the aperture stop 3 to be imaged as a substantially linear image on the deflecting surface 5a of the light deflector 5 in a sub-scanning cross-section.

The diffracting optical element 4 in the present embodiment has a grating structure comprising, for example, a binary diffracting optical element comprising a staircase-like diffraction grating by photoetching, or a Fresnel-like diffracting optical element comprising a sawtooth-like diffraction grating formed by surface cutting. Each of the collimator lens 2, the stop 3 and the diffracting optical element 4 constitutes an element of a first optical system $L_1$.

Reference numeral 5 designates a light deflector as deflecting means comprising, for example, a polygon mirror (rotatable polygon mirror) that is rotated at a constant speed in the direction of arrow A by drive means (not shown) such as a motor.

Reference numeral 6 denotes an fθ lens (scanning optical element) having the fθ characteristic and comprising a single lens formed of a plastic material, and having its opposite lens surfaces in the main scanning direction comprised of an aspherical shape, and having different refractive powers between the main scanning direction and the sub-scanning direction. The fθ lens causes the light beam based on image information which has been deflected by the light deflector 5 to be imaged on a photosensitive drum surface 7 which is a recording medium which is a surface to be scanned and corrects the surface inclination of the deflecting surface of the light deflector 5. The fθ lens 6 constitutes an element of a second optical system $L_2$.

In the present embodiment, the divergent light beam emitted from the semiconductor laser 1 is converted into a substantially parallel light beam by the collimator lens 2, and this light beam (the quantity of light) is limited by the aperture stop 3 and enters the diffracting optical element 4. That part of the parallel light beam having entered the diffracting optical element 4 which is in the main scanning cross-section emerges intactly therefrom. Also, in the sub-scanning cross-section, it converges and is imaged as a substantially linear image (a long linear image in the main scanning direction) on the deflecting surface 5a of the light deflector 5. The light beam deflected by the deflecting surface 5a of the light deflector 5 is directed onto the photosensitive drum surface 7 through the fθ lens 6, and the light deflector 5 is rotated in the direction of arrow A, thereby optically scanning, the photosensitive drum surface 7 in the direction of arrow B. Thereby, image recording is effected on the photosensitive drum surface 7 which is a recording medium.

Figure 3:
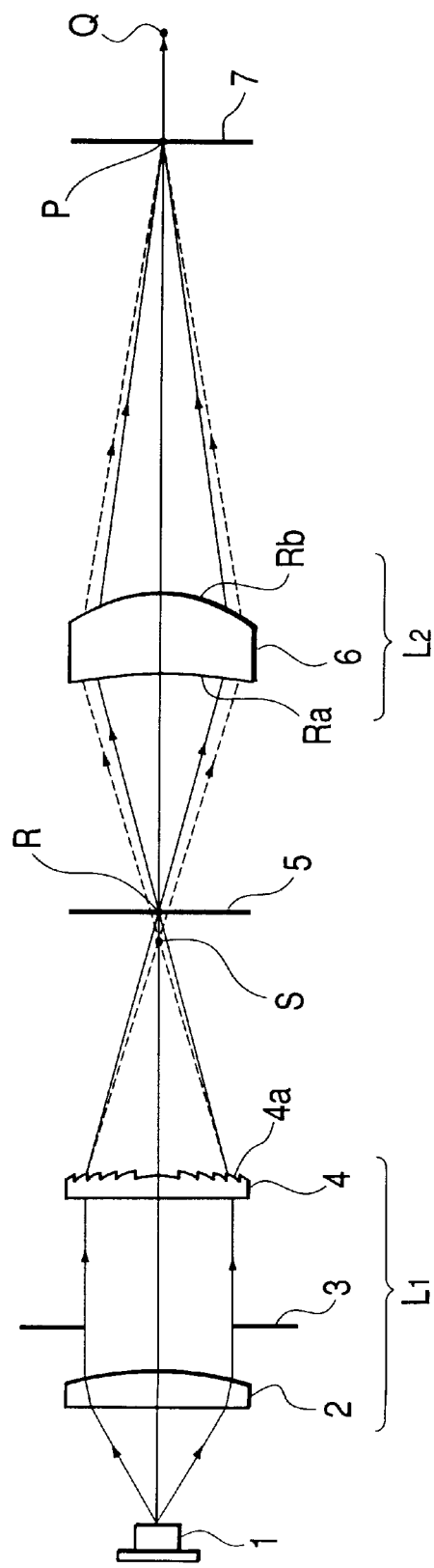
FIG 3 illustrates the principle of correction of a focus fluctuation in a sub-scanning direction in Embodiment 1 of the present invention.

Here, the principle of correction of a focus fluctuation in the sub-scanning direction in the present embodiment will be described with reference to FIG. 3. FIG. 3 is a cross-sectional view of the essential portions of an optical system in the present embodiment in the sub-scanning direction. In FIG. 3, the same elements as the elements shown in FIG. 2 are given the same reference characters.

Here, let it be assumed that, for example, the scanning optical system has risen in temperature due to the influence of environmental fluctuations. If the fθ lens 6 is formed of a plastic material, the focus position in the sub-scanning direction will fluctuate from a point P to a point Q in FIG. 3 to thereby cause out-of-focus because the plastic material has the characteristic that its refractive index is reduced when temperature rises.

However, the semiconductor laser 1 which is a light source has the characteristic that its oscillation wavelength usually becomes longer as the temperature rises. When the oscillation wavelength becomes longer, the angle of diffraction at which it is diffracted by the diffracting optical element 4 becomes greater and thus, the light beam originally imaged in a linear shape at a point R near the deflecting surface of the light deflector 5 is imaged in a linear shape at a point S nearer to the semiconductor laser 1 than the point R as shown in FIG. 3. Thus, the focus position which has been fluctuated to the point Q by a reduction in the refractive index of the fθ lens is returned to the point P.

On the basis of the principle as described above, the powers of the diffracting optical element 4 and the fθ lens 6 in the sub-scanning direction are optimally set in the present embodiment, whereby a focus fluctuation (aberration fluctuation) in the sub-scanning direction by the environmental fluctuations of the apparatus (particularly temperature fluctuation and the wavelength fluctuation of the semiconductor laser 1) can be corrected substantially completely.

Tables 1 and 2 below show the optical arrangement in the present embodiment and the aspherical coefficients of the fθ lens 6, and the phase term of the diffracting optical element 4, respectively.

TABLE 1

| used wavelength | λ (nm) | 780 |
|---|---|---|
| refractive index of fθ lens | n | 1.524 |
| polygon angle of incidence | θi | −65 |
| polygon maximum angle of emergence | θmax | 45 |
| diffracting surface-polygon | d0 | 23.913 |
| polygon-fθ lens | d1 | 20.915 |
| center thickness of fθ lens | dL | 7.5 |
| fθ lens-surface to be scanned | Sk | 125.879 |
| focal length of fθ lens | f | 133.69 |
| polygon | φ20, tetrahedron | |

| First surface | | Second surface | |
|---|---|---|---|
| R | 49.464 when Y is + | R | 160.673 when Y is + |
| Ku | −1.75325E + 01 | Ku | −1.43487E + 02 |
| B4u | −9.79528E − 06 | B4u | −1.09382E − 05 |
| B6u | 5.71251E − 09 | B6u | 4.70016E − 09 |
| B8u | 7.03030E − 14 | B8u | −2.74757E − 12 |
| B10u | −1.06320E − 15 when Y is − | B10u | 1.00200E − 15 when Y is − |
| K1 | −4.20091E + 00 | K1 | −7.79269E + 00 |
| B41 | −9.79528E − 06 | B41 | −6.44856E − 06 |
| B61 | 5.71251E − 09 | B61 | −1.16920E − 09 |
| B81 | 7.03030E − 14 | B81 | 3.12133E − 12 |
| B101 | −1.06320E − 15 | B101 | −1.20296E − 15 |
| r | 99.464 when Y is + | r | −12.5890 when Y is + |
| D2u | 0.00000E + 00 | D2u | 1.65236E − 03 |
| D4u | 0.00000E + 00 | D4u | −4.62943E − 06 |
| D6u | 0.00000E + 00 | D6u | 1.08336E − 08 |
| D8u | 0.00000E + 00 | D8u | −1.50624E − 11 |
| D10u | 0.00000E + 00 when Y is − | D10u | 8.78607E − 15 when Y is − |
| D21 | 0.00000E + 00 | D21 | 1.24934E − 03 |
| D41 | 0.00000E + 00 | D4 | 2.08457E − 07 |
| D61 | 0.00000E + 00 | D61 | −5.35866E − 09 |
| D81 | 0.00000E + 00 | D81 | 9.66153E − 12 |
| D101 | 0.00000E + 00 | D101 | −5.47740E − 15 |

TABLE 2

| phase term of diffracting element | |
| --- | --- |
| C1 | −2.09093E − 02 |
| C2 | 0.00000E + 00 |
| C3 | 0.00000E + 00 |

The diffracting surface 4a of the diffracting optical element 4 in the present embodiment is constructed on the light deflector 5 side, and when the phase function is φ(y,z) and the point of intersection with the optical axis is the origin and the direction of the optical axis is the x-axis and an axis orthogonal to the optical axis in the main scanning plane is the y-axis and an axis orthogonal to the optical axis in the sub-scanning plane is the z-axis, the phase function is represented by the following expression:

$$\phi(y, z) = \frac{2\pi}{\lambda}(C_1 z^2 + C_2 y^2 z^2 + C_3 y^4 z^2)$$

$C_1$ to $C_3$: phase polynominal coefficient,
λ=780 nm

Also, as regards the lens shape of the fθ lens 6, when the point of intersection of each lens surface with the optical axis is the origin and the direction of the optical axis is the x-axis and an axis orthogonal to the optical axis in the main scanning plane is the y-axis and an axis orthogonal to the optical axis in the sub-scanning plane is the z-axis, the main scanning cross-sectional shape is represented by the following expression:

$$x = \frac{y^2/R}{1 + (1 - (1 + K)(y/R)^2)^{1/2}} + B_4 y^4 + B_6 y^6 + B_8 y^8 + B_{10} y^{10}$$

In the foregoing expression, R is the radius of curvature, and K and $B_4$–$B_{10}$ are aspherial coefficients. When the value of y is positive, the main scanning cross-sectional shape is a lens shape calculated by the use of Ku and $B_4$u–$B_{10}$u having a suffix u as the aspherical coefficients, and when the value of y is negative, it is a lens shape calculated by the use of k1 and $B_4$1–$B_{10}$1 having a suffix 1 as the aspherical coefficients.

Also, in the sub-scanning cross-section, the radius of curvature thereof changes continuously and as regards the lens coordinates on the main scanning plane, the radius of curvature r', which is y is represented by the following expression:

r'=r(1+$D_2 y^2$+$D_4 y^4$+$D_6 y^6$+$D_8 y^8$+$D_{10} y^{10}$).

In the foregoing expression, r is the radius of curvature on the optical axis, and $D_2$–$D_{10}$ are coefficients. When the value of y is positive, the radius of curvature in the sub-scanning cross-section is a radius of curvature r' calculated by the use of $D_2$u–$D_{10}$u having a suffix u as the coefficients, and when the value of y is negative, it is a radius of curvature r' calculated by the use of $D_2$1–$D_{10}$1 having a suffix 1 as the coefficients.

Figure 4:
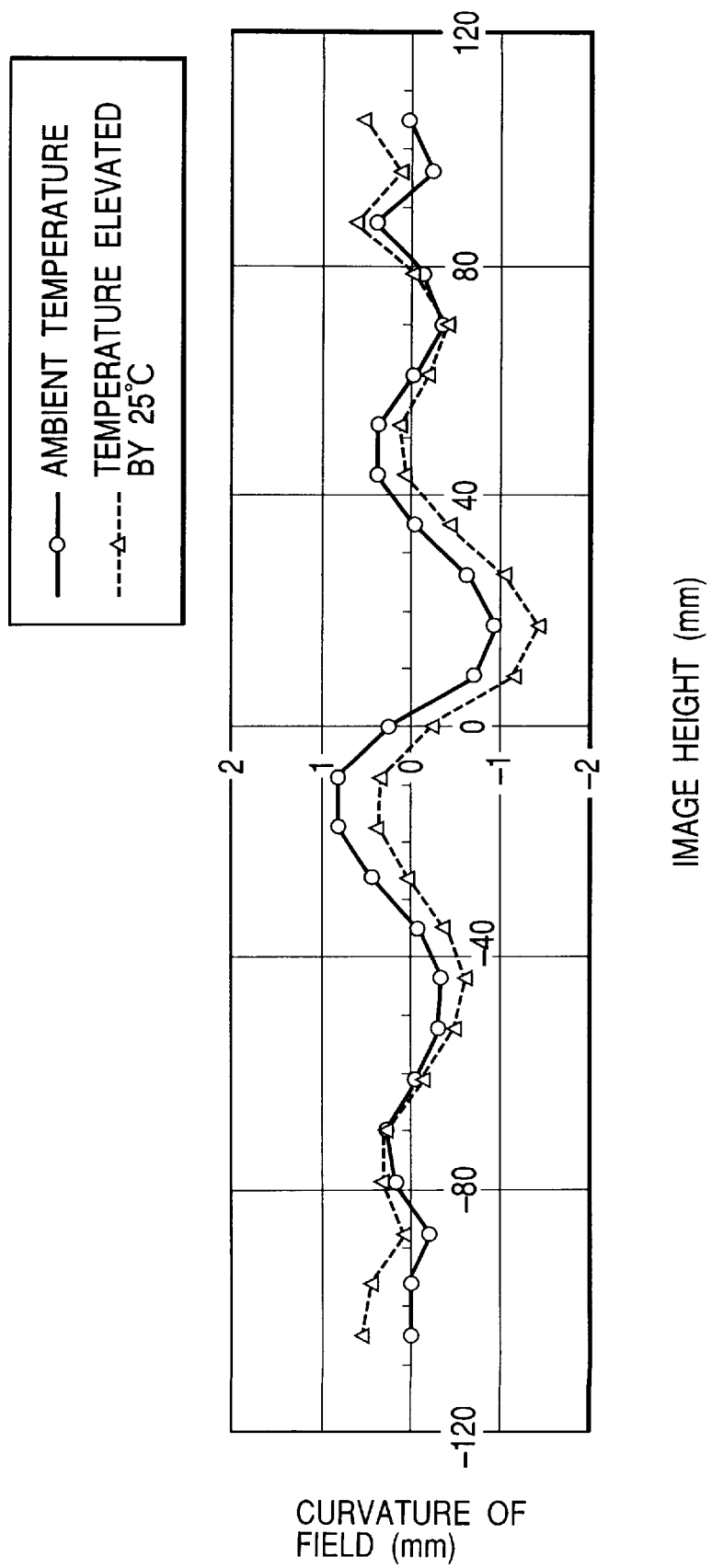
FIG. 4 shows the curvature of field of Embodiment 1 of the present invention in the sub-scanning direction.

FIG. 4 is an aberration graph showing the curvature of field of the present embodiment in the sub-scanning direction before and after a temperature rise, and the solid line indicates the characteristic at the ordinary temperature (25° C.), and the dotted line indicates the characteristic when a temperature rise of 25° C. occurred and the temperature has reached 50° C. From this graph, it is seen that there is little or no focus change in the sub-scanning direction before and after the temperature rise.

Thus, in the present embodiment, the apparatus is constructed by the use of the diffracting optical element 4 instead of the cylindrical lens (see FIG. 1) heretofore used as an element of the first optical system, and the power of the diffracting optical element 4 in the sub-scanning direction (diffracting power) and the power of the fθ lens 6 in the sub-scanning direction (refracting power) are appropriately set to thereby effectively correct a focus change in the sub-scanning direction resulting from the environmental fluctuations of the apparatus (temperature fluctuation and the wavelength fluctuation of the semiconductor laser 1). Thereby, a scanning optical system strong against environmental fluctuations and suited for highly minute printing can be obtained compactly and inexpensively.

Figure 5:
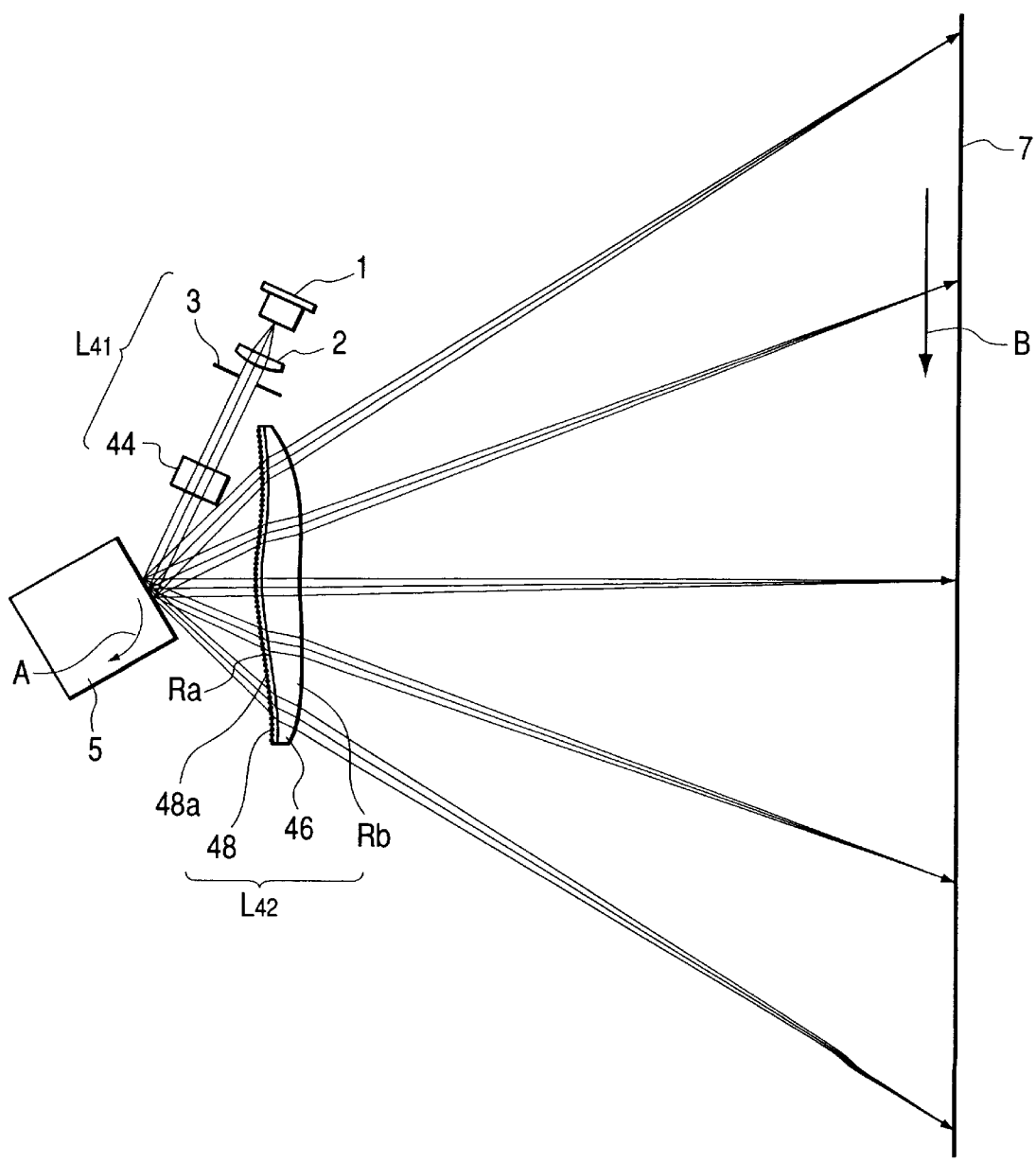
FIG. 5 is a cross-sectional view of the essential portions of Embodiment 2 of the scanning optical apparatus of the present invention in the main scanning direction.

FIG. 5 is a cross-sectional view of essential portions in the main scanning direction when a scanning optical apparatus according to Embodiment 2 of the present invention is applied to an image forming apparatus. In FIG. 5, the same elements as the elements shown in FIG. 2 are given the same reference numerals.

Figure 1:
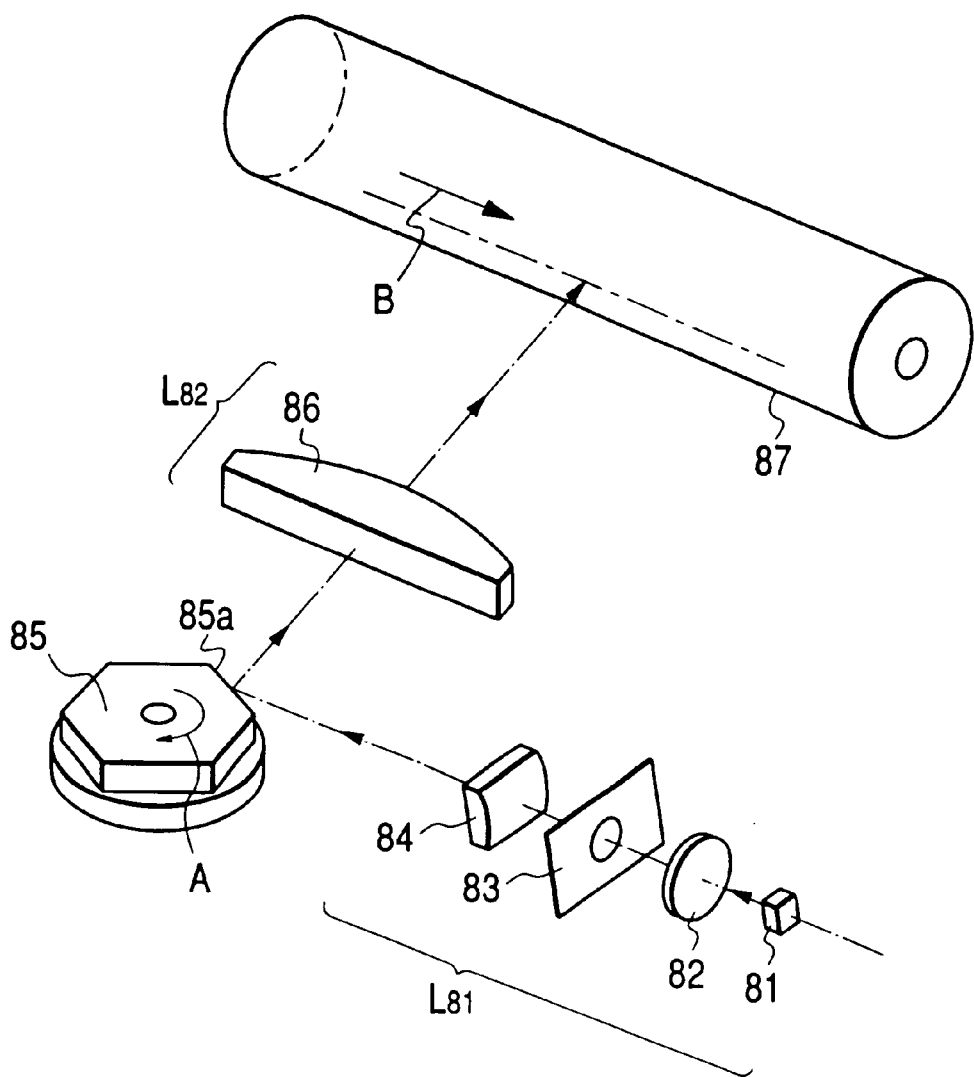
FIG. 1 a schematic view of the essential portions of a scanning optical apparatus according to the prior art.

The difference of the present embodiment from the aforedescribed Embodiment 1 is that a diffracting optical element is added to the lens surface of the fθ lens constituting the second optical system which is adjacent to the light deflector and the first optical system is comprised of a collimator lens, a stop and a cylindrical lens as in the prior-art construction (see FIG. 1). In the other points, the construction and optical action of the present embodiment are substantially similar to those of the aforedescribed Embodiment 1, whereby a similar effect is obtained.

That is, in FIG. 5, reference numeral 46 designates an fθ lens as the second optical system $L_{42}$. The fθ lens comprises a single lens of an aspherical shape formed of a plastic material, and a diffracting optical element 48 having power (diffracting power) in the sub-scanning direction is added to the lens surface (the first surface) Ra of the single lens which is adjacent to the light deflector 5, and the diffracting surface 48a of the diffracting optical element 48 is represented by the same expression as that in the aforementioned Embodiment 1.

That is, as regards the diffracting surface 48a of the diffracting optical element 48 added to the first surface Ra of the fθ lens 46, when the phase function is φ(y,z) and the point of intersection of the first surface Ra with the optical axis is the origin and the direction of the optical axis is the x-axis and an axis orthogonal to the optical axis in the main scanning plane is the y-axis and an axis orthogonal to the optical axis in the sub-scanning plane is the z-axis, the phase function is represented by the following expression:

$$\phi(y, z) = \frac{2\pi}{\lambda}(C_1 z^2 + C_2 y^2 z^2 + C_3 y^4 z^2)$$

$C_1$–$C_3$: phase polynominal coefficients,
λ=780 nm

Reference numeral 44 denotes a cylindrical lens constituting an element of the first optical system $L_{41}$ and having predetermined refractive power in the sub-scanning direction.

Description will now be made of the principle of correction of a focus fluctuation in the sub-scanning direction in the present embodiment.

Let it be assumed that when the scanning optical apparatus according to the present embodiment is at an environmental temperature t° C., the refractive index of the fθ lens 46 is n and the oscillation wavelength of the semiconductor laser 1 is λ.

When the temperature dependency coefficient of the refractive index of the fθ lens 46 is dn/dt and the temperature dependency coefficient of the wavelength of the semiconductor laser 1 is dλ/dt and the wavelength dependency coefficient of the refractive index of the fθ lens is dn/dλ, the refractive index n' of the fθ lens 46 and the wavelength λ' of the semiconductor laser 1 when the environmental temperature has changed by Δt are respectively expressed as $$n' = n + \frac{dn}{dt}\Delta t + \frac{dn}{d\lambda} \cdot \frac{d\lambda}{dt}\Delta t$$

and $$\lambda' = \lambda + \frac{d\lambda}{dt}\Delta t.$$

On the other hand, when the grating spatial frequency at a ray passage point on the diffracting surface 48a is H, the power $\phi_B$ of the diffracting optical element 48 formed on the first surface Ra of the fθ lens 46 is represented by $$\phi_B = m\lambda \frac{dH}{dr}$$

$r=(y^2+z^2)^{1/2}$, m is the order of diffraction, and

λ is the wavelength.

Consequently, assuming that the radius of curvature of the first surface Ra of the fθ lens 46 on the optical axis of the sub-scanning cross-section is $r_1$, the radius of curvature of the second surface Rb thereof on the optical axis of the sub-scanning cross-section is $r_2$, and for simplicity, a thin-walled system is assumed and the power of the diffracting optical element 48 and the power by refraction exist at the same place, the power $\phi_t$ of the fθ lens 46 in the sub-scanning direction when the environmental temperature is t° C. is represented by the following expression:

$$\phi_t = m\lambda \frac{dH}{dr} + (n-1)\left(\frac{1}{r_1} - \frac{1}{r_2}\right) \quad (1)$$

On the other hand, the power $\phi'_t$ of the fθ lens in the sub-scanning direction when the environmental temperature has changed by Δt is represented by the following expression:

$$\phi'_t = m\left(\lambda_1 + \frac{d\lambda}{dt}\Delta t\right)\frac{dH}{dr} + \left(n + \frac{dn}{dt}\Delta t + \frac{dn}{d\lambda} \cdot \frac{d\lambda}{dt}\Delta t - 1\right)\left(\frac{1}{r_1} - \frac{1}{r_2}\right) \quad (2)$$

If here, irrespective of the environmental temperature, the power of the fθ lens 46 in the sub-scanning direction is always kept constant, any focus fluctuation in the sub-scanning direction will not occur in principle.

Consequently, assuming that expression (1) and expression (2) are equal to each other, finally $$m\frac{dH}{dr} \cdot \frac{d\lambda}{dt}\Delta t + \left(\frac{1}{r_1} - \frac{1}{r_2}\right)\left(\frac{dn}{dt}\Delta t + \frac{dn}{d\lambda} \cdot \frac{d\lambda}{dt}\Delta t\right) = 0 \quad (3)$$

With the order of diffraction as the first order, the power $\phi_B$ of the diffracting optical element (diffracting portion) 48 of the fθ lens 46 is $$\phi_B = \lambda \frac{dH}{dr}$$

and the power $\phi_L$ of the other portion (refracting portion) than the diffracting optical element of the fθ lens 46 is $$\phi_L = (n-1)\left(\frac{1}{r_1} - \frac{1}{r_2}\right)$$

and hence, expression (3) becomes $$\frac{\phi_B}{\lambda} \cdot \frac{d\lambda}{dt} + \frac{\phi_L}{n-1}\left(\frac{dn}{dt} + \frac{dn}{d\lambda} \cdot \frac{d\lambda}{dt}\right) = 0 \quad (4)$$

and if the power $\phi_B$ of the diffracting portion of the fθ lens 46 and the power $\phi_L$ of the refracting portion thereof are decided so as to satisfy this expression, the focus fluctuation by environmental fluctuations (temperature fluctuation and the wavelength fluctuation of the semiconductor laser) can be corrected substantially completely.

Here, taking into consideration the values which can be actually assumed by dλ/dt, dn/dt and dn/dλ, when finally the power of the diffracting portion of the fθ lens 46 in the sub-scanning direction is $\phi_B$ and the power of the refracting portion thereof in the sub-scanning direction is $\phi_L$, it is desirable to set each power so as to satisfy the following condition:

$$1.0 \leq \phi_L/\phi_B \leq 2.6 \quad (5)$$

Conditional expression (5) relates to the ratio between the power of the refracting portion constituting the fθ lens 46 and the power of the diffracting portion, and if conditional expression (5) is departed from, it will become difficult to correct any focus change in the sub-scanning direction resulting from the environmental fluctuations of the apparatus, and this is not good.

In the present embodiment, $$\phi_L/\phi_B = 1.171$$

and conditional expression (5) is satisfied.

Tables 3 and 4 below show the optical arrangement in the present embodiment and the aspherical coefficient of the fθ lens 46, and the phase term of the diffracting optical element 48, respectively.

TABLE 3

| | | |
|---|---|---|
| used wavelength | λ(nm) | 780 |
| refractive index of fθ lens | n | 1.524 |
| polygon incidence of angle | θi | −65 |
| polygon maximum angle of emergence | θmax | 45 |
| polygon-fθ lens | d1 | 20.915 |
| center thickness of fθ lens | dL | 7.5 |
| fθ lens-surface to be scanned | Sk | 125.879 |
| focal length of fθ lens | f | 133.69 |
| polygon | φ20, | tetrahedron |

|  | First surface |  | Second surface |
|---|---|---|---|
| R | 49.464<br>when Y is + | R | 160.673<br>when Y is + |
| Ku<br>B4u<br>B6u<br>B8u<br>B10u | −1.75325E + 01<br>−9.79528E − 06<br>5.71251E − 09<br>7.03030E − 14<br>−1.06320E − 15<br>when Y is − | Ku<br>B4u<br>B6u<br>B8u<br>B10u | −1.43487E + 02<br>−1.09382E − 05<br>4.70016E − 09<br>−2.74757E − 12<br>1.00200E − 15<br>when Y is − |
| K1<br>B41<br>B61<br>B81<br>B101<br>r | −4.200091E + 00<br>−9.79528E − 06<br>5.71251E − 09<br>7.03030E − 14<br>−1.06320E − 15<br>−51.668<br>when Y is + | K1<br>B41<br>B61<br>B81<br>B101<br>r | −7.79269E + 00<br>−6.44856E − 06<br>−1.16920E − 09<br>3.12133E − 12<br>−1.20296E − 15<br>−14.6234<br>when Y is + |
| D2u<br>D4u<br>D6u<br>D8u<br>D10u | 0.00000E + 00<br>0.00000E + 00<br>0.00000E + 00<br>0.00000E + 99<br>0.00000E + 00<br>when Y is − | D2u<br>D4u<br>D6u<br>D8u<br>D10u | 1.24290E − 03<br>−3.76988E − 06<br>5.30548E − 09<br>−3.17865E − 12<br>1.24960E − 16<br>when Y is − |
| D21<br>D41<br>D61<br>D81<br>D101 | 0.00000E + 00<br>0.00000E + 00<br>0.00000E + 00<br>0.00000E + 00<br>0.00000E + 00 | D21<br>D41<br>D61<br>D81<br>D101 | 1.00192E − 03<br>−1.44682E − 06<br>−1.70141E − 10<br>1.26126E − 12<br>−5.27229E − 16 |

TABLE 4

| phase term of diffracting element | |
|---|---|
| C1 | −1.17334E − 02 |
| C2 | 7.18464E − 06 |
| C3 | −2.65115E − 14 |

Figure 6:
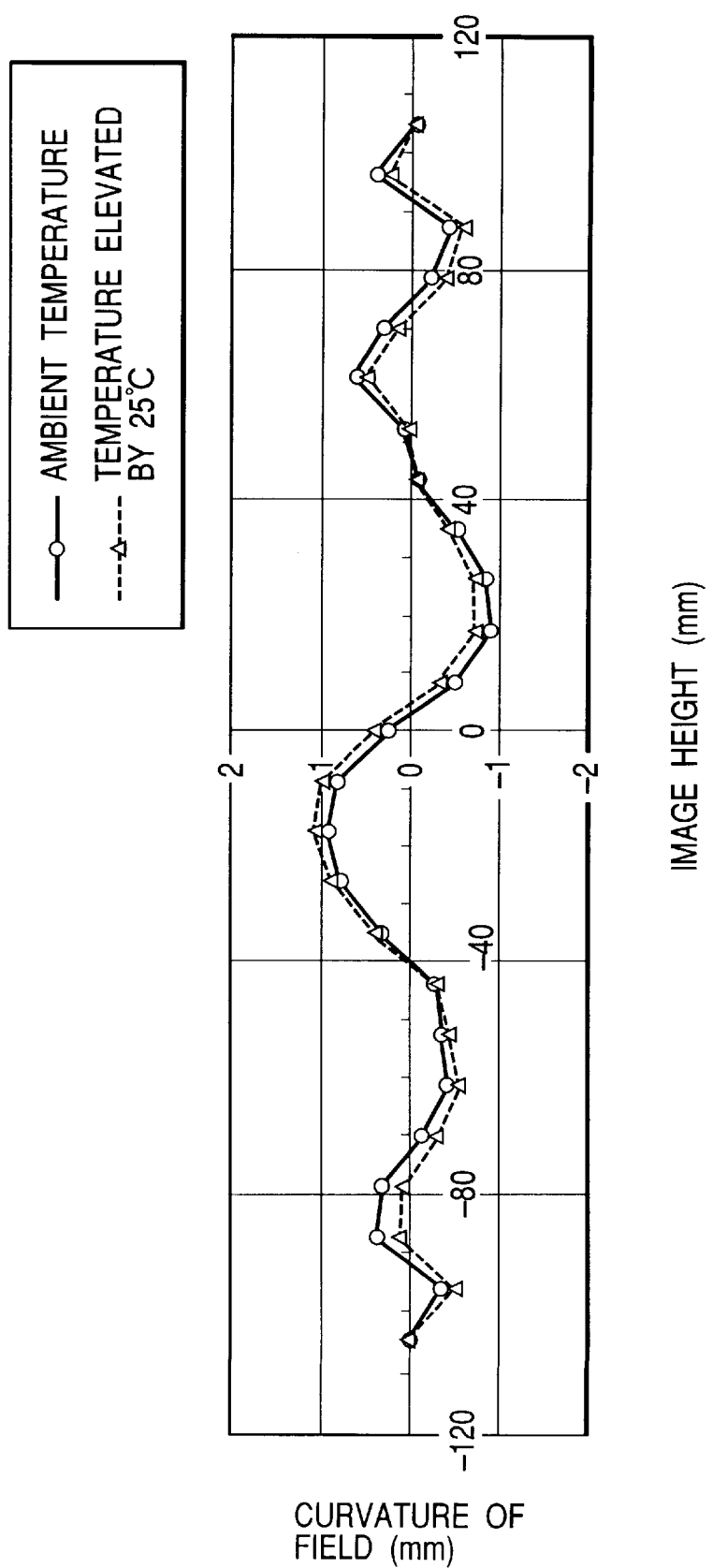
FIG. 6 shows the curvature of field of Embodiment 2 of the present invention in the sub-scanning direction.

FIG. 6 is an aberration graph showing the curvature of field of the present embodiment in the sub-scanning direction before and after a temperature rise, and the solid line indicates the characteristic at the ordinary temperature (25° C.) and the dotted line indicates the characteristic when a temperature rise of 25° C. has occurred and the temperature has reached 50° C. From this graph, it is seen that there is little or no focus change in the sub-scanning direction before and after the temperature rise.

Thus, in the present embodiment, the diffracting optical element 48 is added to that lens surface Ra of the fθ lens 46 which is the second optical system $L_{42}$ which is adjacent to the light deflector 5 as described above, and the power (diffracting power) of the diffracting portion of the fθ lens 46 in the sub-scanning direction and the power (refracting power) of the refracting portion thereof in the sub-scanning direction are appropriately set to thereby well correct a focus change in the sub-scanning direction resulting from the environmental fluctuations of the apparatus (temperature fluctuation and the wavelength fluctuation of the semiconductor laser 1). Thereby, a scanning optical system strong against environmental fluctuations and suited for highly minute printing can be obtained compactly and inexpensively.

Figure 7:
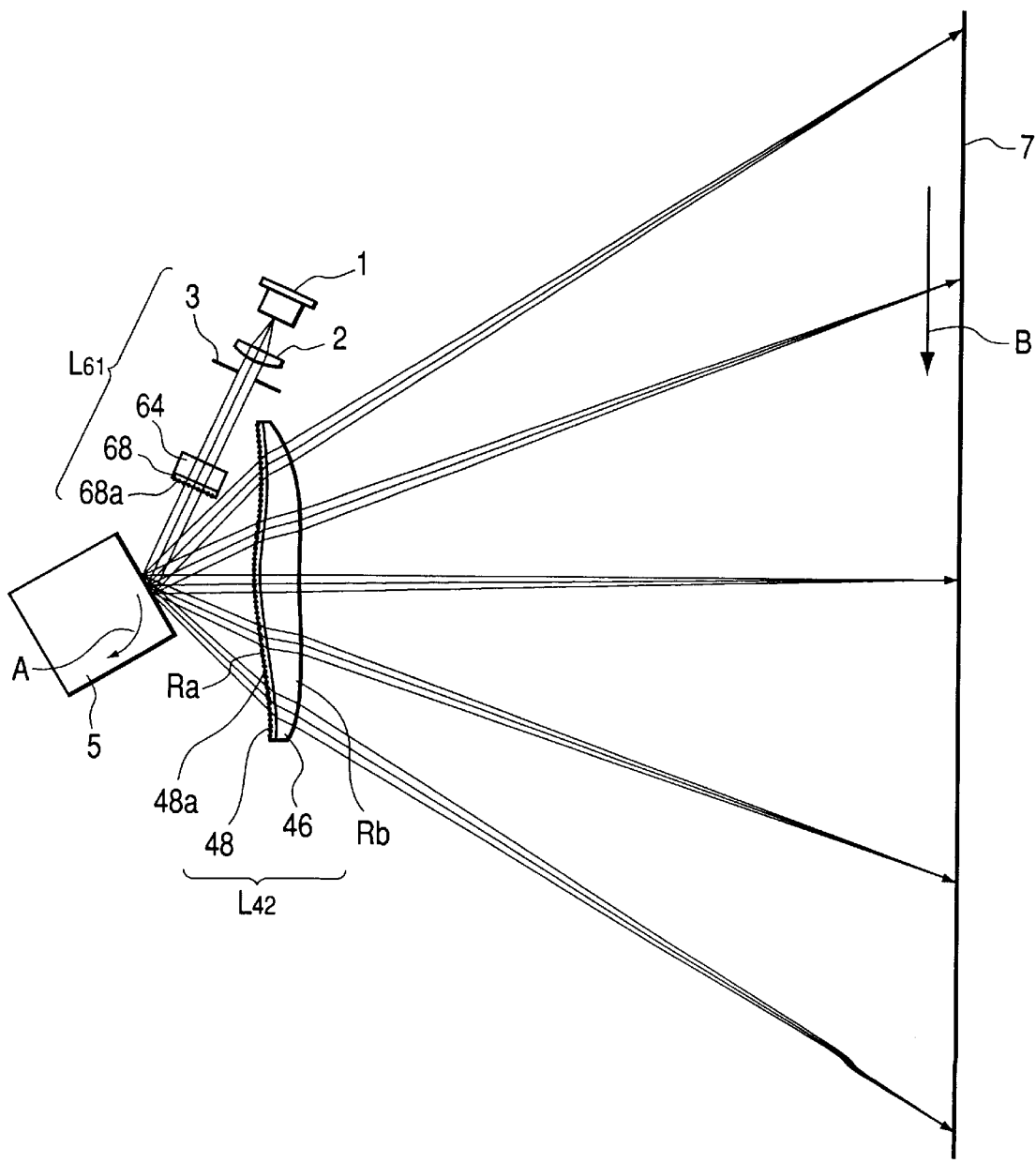
FIG. 7 is a cross-sectional view of the essential portions of Embodiment 3 of the scanning optical apparatus of the present invention in the main scanning direction.

FIG. 7 is a cross-sectional view of essential portions in the main scanning direction when a scanning optical apparatus according to Embodiment 3 of the present invention is applied to an image forming apparatus. In FIG. 7, the same elements as the elements shown in FIG. 5 are given the same reference characters.

The difference of the present embodiment from the aforedescribed Embodiment 2 is that a diffracting optical element is also added to one surface of the cylindrical lens constituting an element of the first optical system. In the other points, the construction and optical action of the present embodiment are substantially similar to those of the aforedescribed Embodiment 1, whereby a similar effect is obtained.

That is, in FIG. 7, reference numeral 64 designates a cylindrical lens constituting an element of a first optical system $L_{61}$, and the lens surface of this cylindrical lens 64 which is adjacent to the light source means 1 is comprised of a cylindrical surface having predetermined power in the sub-scanning direction, and a diffracting optical element 68 having power (diffracting power) in the sub-scanning direction is added to that lens surface (flat surface) which is adjacent to the light deflector 5. Reference numeral 46 denotes an fθ lens similar to that in the aforedescribed Embodiment 2.

In the present embodiment, both of the principle of correction of the focus change in the sub-scanning direction described in Embodiment 1 and the principle of correction of the focus change in the sub-scanning direction described in Embodiment 2 are utilized to well correct any focus change in the sub-scanning direction resulting from the environmental fluctuations of the apparatus. Thereby, in the present embodiment, the power of the diffracting portion (diffracting optical element) of each of the cylindrical lens 64 and the fθ lens 46 in the sub-scanning direction can be set small and as the result, the grating pitches of the diffracting optical elements 68 and 48 can be made great, and this is very advantageous to manufacture.

Tables 5 and 6 below show the optical arrangement in the present embodiment, the aspherical coefficients of the fθ lens 46, the shape of the cylindrical lens 64, and the phase terms of the diffracting optical elements 68 and 48.

TABLE 5

| used wavelength | λ(nm) | 780 |
|---|---|---|
| refractive index of fθ lens | n | 1.524 |
| polygon angle of incidence | θi | −65 |
| polygon maximum angle of emergence | θmax | 45 |
| diffracting surface-polygon | d0 | 45 |
| polygon-fθ lens | d1 | 20.915 |
| center thickness of fθ lens | dL | 7.5 |
| fθ lens-surface to be scanned | Sk | 125.879 |
| focal length of fθ lens | f | 133.69 |
| polygon | φ20, | tetra-hedron |

|  | First surface |  | Second surface |
|---|---|---|---|
| R | 49.464<br>when Y is + | R | 160.673<br>when Y is + |
| Ku<br>B4u<br>B6u<br>B8u<br>B10u | −1.75325E + 01<br>−9.79528E − 06<br>5.71251E − 09<br>7.03030E − 14<br>−1.06320E − 15<br>when Y is − | Ku<br>B4u<br>B6u<br>B8u<br>B10u | −1.43487E + 02<br>−1.09382E − 05<br>4.70016E − 09<br>−2.74757E − 12<br>1.00200E − 15<br>when Y is − |
| K1<br>B41<br>B61 | −4.20091E + 00<br>−9.79528E − 06<br>5.71251E − 09 | K1<br>B41<br>B61 | −7.79269E + 00<br>−6.44856E − 06<br>−1.16920E − 09 |

-continued

| | | | |
|---|---|---|---|
| B81 | 7.03030E − 14 | B81 | 3.12133E − 12 |
| B101 | −1.06320E − 15 | B101 | −1.20296E − 15 |
| r | −55.977 | r | −12.4590 |
| | when Y is + | | when Y is + |
| D2u | 0.00000E + 00 | D2u | 1.19988E − 03 |
| D4u | 0.00000E + 00 | D4u | −3.56812E − 06 |
| D6u | 0.00000E + 00 | D6u | 6.10045E − 09 |
| D8u | 0.00000E + 00 | D8u | −5.35878E − 12 |
| D10u | 0.00000E + 00 | D10u | 1.86786E − 15 |
| | when Y is − | | when Y is − |
| D21 | 0.00000E + 00 | D21 | 9.37917E − 04 |
| D41 | 0.00000E + 00 | D41 | −7.11651E − 07 |
| D61 | 0.00000E + 00 | D61 | −2.25965E − 09 |
| D81 | 0.00000E + 00 | D81 | 5.04127E − 12 |
| D101 | 0.00000E + 00 | D101 | −2.97423E − 15 |

TABLE 6 meridian R of cylindrical lens
32.22
refractive index of cylindrical lens
1.51072
thickness of cylindrical lens
5 mm Phase term of cylindrical lens diffracting element

| | |
|---|---|
| C1 | −2.89387E − .03 |
| C2 | 0.00000E + 00 |
| C3 | 0.00000E + 00 |

Phase term of Fθ lens diffracting element

| | |
|---|---|
| C1 | −6.40307E − 03 |
| C2 | 2.11016E − 06 |
| C3 | −2.65115E − 14 |

Figure 8:
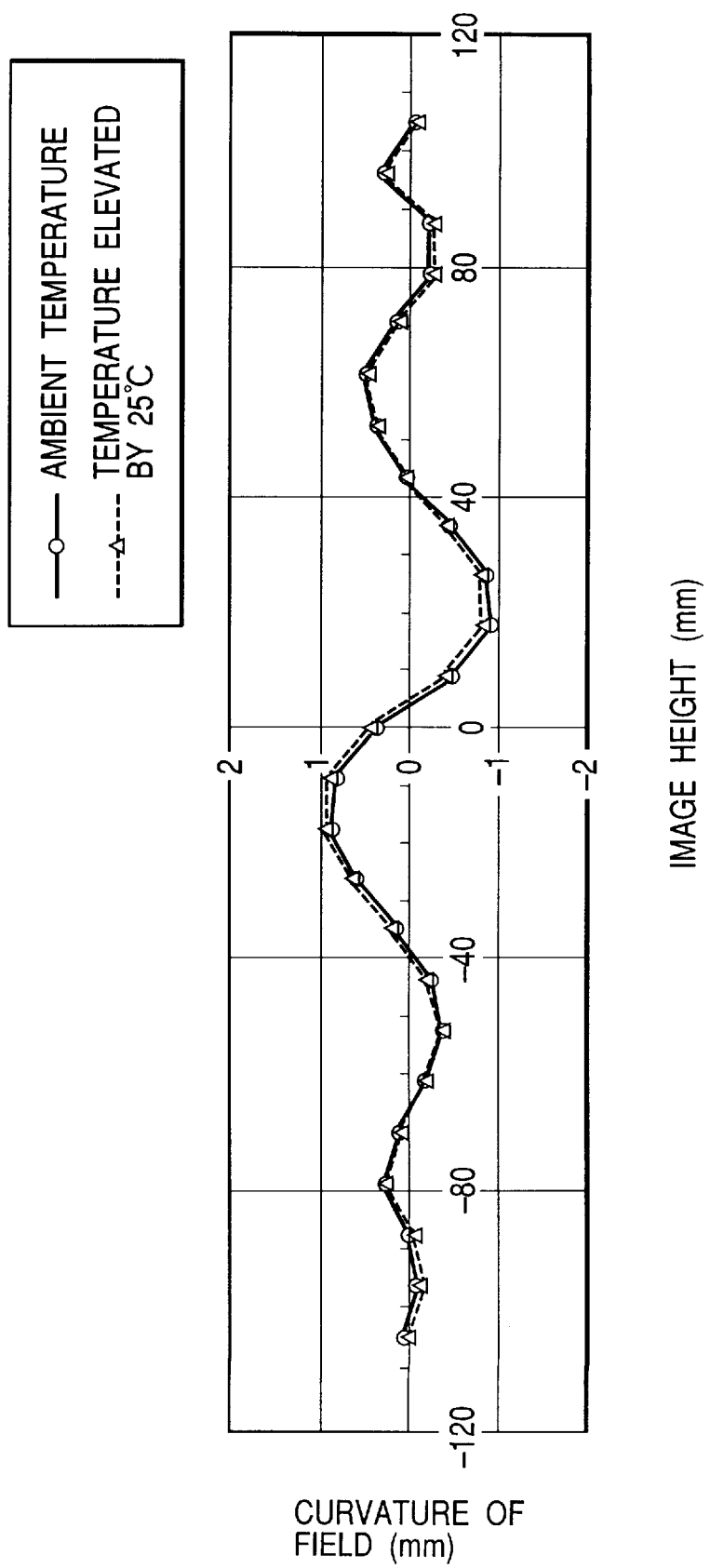
FIG. 8 shows the curvature of field of Embodiment 3 of the present invention in the sub-scanning direction.

FIG. 8 is an aberration graph showing the curvature of field of the present embodiment in the sub-scanning direction before and after a temperature rise, and the solid line indicates the characteristic at the ordinary temperature (25° C.), and the dotted line indicates the characteristic when a temperature rise of 25° C. has occurred and the temperature has reached 50° C. From this graph, it is seen that there is little or no focus change in the sub-scanning direction before and after the temperature rise.

Thus, in the present embodiment, a diffracting optical element is provided in each of the first optical system $L_{61}$ and the second optical system $L_{42}$ as described above, whereby the grating pitch of each diffracting optical element can be set to a great value and thus, there can be constructed a scanning optical system which is very easy to manufacture. While in the present embodiment, the diffracting optical element is added to one surface of the cylindrical lens 64, this is not restrictive, but a diffracting optical element may be added to one surface of the collimator lens 2.

In the above-described Embodiments 2 and 3, a diffracting optical element is added to at least one surface of the optical element constituting each optical system, whereas this is not restrictive, but the diffracting optical element may be constructed independently in the optical path.

According to the present invention described above, a diffracting optical element is provided in at least one of the first optical system disposed on the light source means side with respect to the light deflector and the second optical system disposed on the surface to be scanned side as previously described, and any aberration fluctuation (focus change) in the sub-scanning direction resulting from the environmental fluctuations of the apparatus (temperature fluctuation and the wavelength fluctuation of the semiconductor laser) is corrected by a change in the power of the diffracting optical element and a change in the power of the optical system, whereby there can be achieved a compact scanning optical apparatus which is not affected by the environmental fluctuations but is suited for highly minute printing, and an image forming apparatus using the same.

Particularly when the diffracting optical element is provided in the second optical system, the power of each element is appropriately set so as to satisfy the aforementioned conditional expression (5), whereby there can be achieved a compact scanning optical apparatus which is not affected by the environmental fluctuations but is suited for highly minute printing, and an image forming apparatus using the same.

In the above-described embodiments, description has been made of the fact that in a scanning optical apparatus wherein the light beam emitted from the light source means 1 is directed to the deflecting means 5 through the first optical system $L_1$ and the light beam deflected by the deflecting means is imaged on the surface 7 to be scanned through the second optical system $L_2$ to thereby optically scan the surface to be scanned, the diffracting optical element 4 is provided in at least one of the first and second optical systems, thereby correcting the aberration fluctuation of the scanning optical apparatus in the sub-scanning direction caused by the environmental fluctuations.

In the embodiments shown below, description will be made of the fact that a diffracting optical element is provided in each of a first optical system disposed on the light source means side with respect to the light deflector and a second optical system disposed on the surface to be scanned side, whereby the degree of freedom of the design of the diffracting optical elements is enhanced and the correction of the optical characteristic can be done singly in each optical system or the correction of the optical characteristic can be done by each diffracting optical element.

Figure 9:
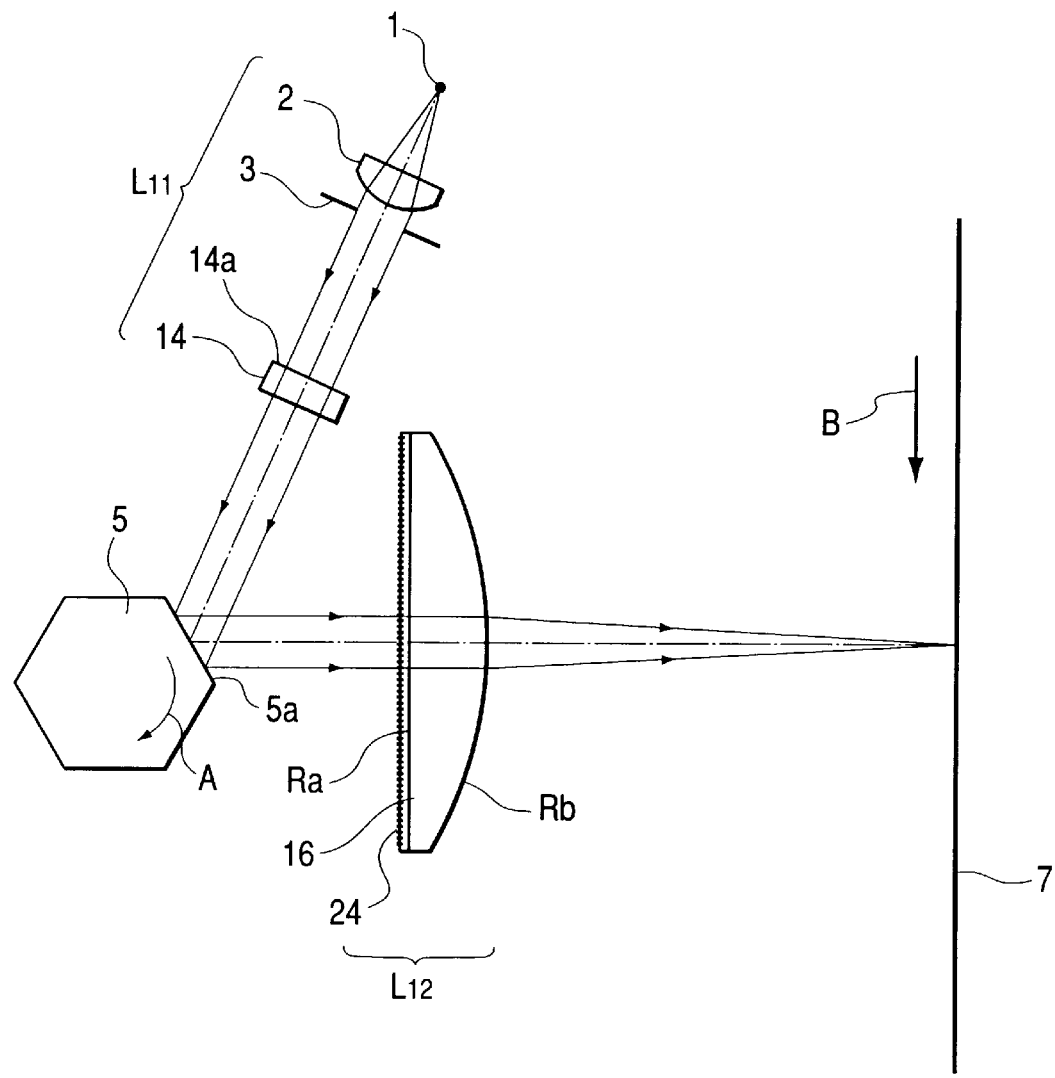
FIG. 9 is a cross-sectional view of the essential portions of Embodiment 4 of the scanning optical apparatus of the present invention in the main scanning direction.
Figure 10:
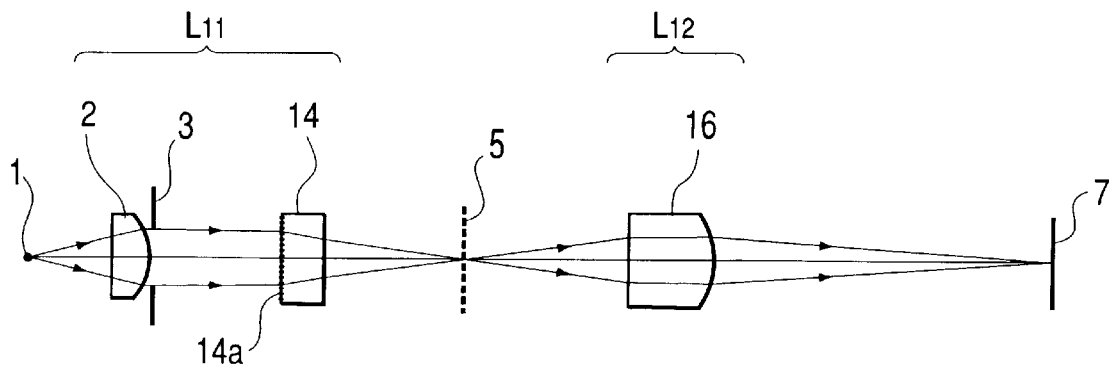
FIG. 10 is a cross-sectional view of the essential portion of Embodiment 4 of the present invention in the sub-scanning direction.

FIG. 9 is a cross-sectional view of the essential portions (main scanning cross-sectional view) of Embodiment 4 of the scanning optical apparatus of the present invention in the main scanning direction, and FIG. 10 is a cross-sectional view of the essential portions (sub-scanning cross-sectional view) of Embodiment 4 of the present invention in the sub-scanning direction.

Figure 11:
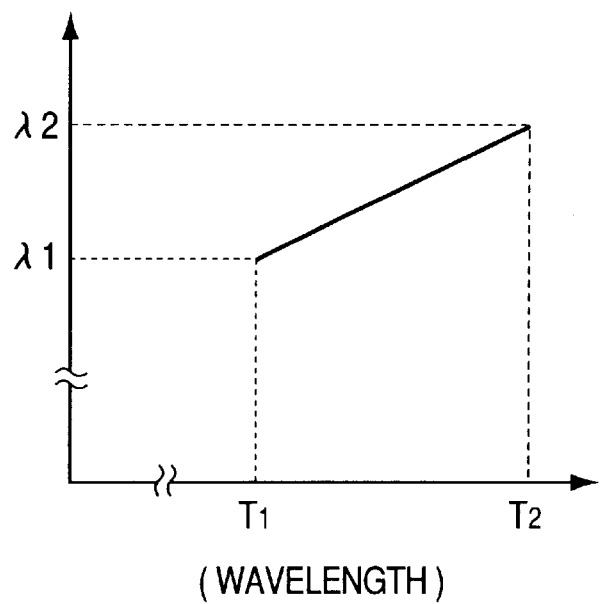
FIG. 11 is a graph showing the temperature wavelength characteristic of a laser diode in Embodiment 4 of the present invention.

In FIGS. 9 and 10, reference numeral 1 designates light source means comprising, for example, a semiconductor laser (laser diode). The semiconductor laser 1 in the present embodiment can oscillate light beams (laser beams) of two different wavelengths $\lambda_1$ and $\lambda_2$, and has the characteristic that the wavelength of the light beam becomes long when the temperature of the apparatus (environmental temperature) becomes high. FIG. 11 is a graph showing the relation between the used temperature of the semiconductor laser 1 and the wavelength of the light beam emitted therefrom.

Reference numeral 2 denotes a collimator lens as a first optical element which converts the divergent light beam emitted from the light source means 1 into a substantially parallel light beam (or a convergent light beam) in the main scanning direction. Reference numeral 3 designates an aperture stop which limits the light beam (the quantity of light) passing therethrough.

Reference numeral 14 denotes a first diffracting optical element as a second optical element added to that flat surface of a both-surface plane parallel plate formed, for example, of a plastic material, which is adjacent to the aperture stop 3. The first diffracting optical element 14 has diffracting action (e.g. positive diffracting action, i.e., converging action, or negative diffracting action, i.e., divergent action) only in the sub-scanning direction perpendicular to the plane of the drawing sheet of FIG. 9, and causes the light beam passed through the aperture stop 3 to be imaged substantially as a linear image on the deflecting surface of a light deflector 5 which will be described later in the sub-scanning cross-section. The diffracting surface 14a of the first diffracting optical element 14 in the present embodiment is constructed on the light source means 1 side.

Each of the collimator lens 2, the aperture stop 3 and the first diffracting optical element 14 constitutes an element of a first optical system $L_{11}$.

Figure 12:
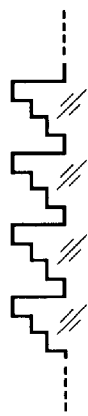
FIG. 12 is a schematic view of the cross-sectional grating pattern of a diffraction element.
Figure 13:
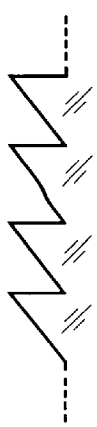
FIG. 13 is a schematic view of the cross-sectional grating pattern of another example of the diffraction lens in Embodiment 4 of the present invention.

FIG. 12 is a cross-sectional view showing the grating pattern of the cross-section of the first diffracting optical element 14. This first diffracting optical element 14 is called a multiphase level and may be made by repeating etching by the use of a photomask, or may be made by cutting. In any case, it is a grating pattern only in the sub-scanning direction and therefore is easy to make. The grating pattern of the cross-section of the first diffracting optical element 14 may be a blazed grating as shown in FIG. 13.

Reference numeral 5 designates a light deflector comprising, for example, a polygon mirror (rotatable polygon mirror) as deflecting means, and rotated at a constant speed in the direction of arrow A in FIG. 9 by drive means (not shown) such as a motor.

Reference numeral 16 denotes an fθ lens having the fθ characteristic which comprises an anamorphic optical element as a third optical element, and which comprises, for example, a single lens formed of a plastic material. The fθ lens 16 in the present embodiment has a second diffracting optical element 24 having diffracting action (e.g. positive diffracting action, i.e., converging action, or negative diffracting action, i.e., divergent action) only in the main scanning direction added to its lens surface (flat surface) Ra on the light deflector 5 side, and has its lens surface Rb on the surface to be scanned side formed by a toric surface. The fθ lens 16 causes the light beam deflected by the light deflector 5 which is based on image information to be imaged in a spot-like shape on a photosensitive drum surface 7 which is the surface to be scanned, and corrects the surface inclination of the deflecting surface of the light deflector 5. The fθ lens constitutes an element of a second optical system $L_{12}$.

FIG. 12 shows the grating pattern of the cross-section of a second diffracting optical element 24 added to the lens surface Ra of the fθ lens 16. This second diffracting optical element 24, like the aforedescribed first diffracting optical element 14, is called a multiphase level, and may be made by repeating etching by the use of a photomask, or may be made by cutting. In any case, it is a grating pattern only in the main scanning direction and therefore is easy to make. The grating pattern of the cross-section of the second diffracting optical element 24 may be a blazed grating as shown in FIG. 13.

The divergent light beam emitted from the semiconductor laser 1 in the present embodiment is converted into a substantially parallel light beam in the main scanning direction by the collimator lens 2, and the light beam (the quantity of light) is limited by the aperture stop 3 and enters the first diffracting optical element 14. That part of the light beam having entered the first diffracting optical element 14 which is in the main scanning cross-section emerges intactly therefrom. Also, in the sub-scanning cross-section, the light beam converges and is formed substantially as a linear image (a linear image long in the main scanning direction) on the deflecting surface 5a of the light deflector 5. The light beam deflected by the deflecting surface 5a of the light deflector 5 is directed to the photo-sensitive drum surface 7 through the fθ lens 16, and the light deflector 5 is rotated in the direction of arrow A to thereby optically scan the photosensitive drum surface 7 in the direction of arrow B. Thereby, image recording is effected on the photosensitive drum surface 7 which is a recording medium.

In the present embodiment, as described above, the first diffracting optical element 14 has diffracting action (power) in the sub-scanning direction, and when the wavelength of the light beam from the semiconductor laser 1 changes and shifts, for example, to the long wavelength side, the positive power of the fθ lens 16 in the sub-scanning direction becomes loose and it is corrected by the optical action of the first diffracting optical element 14 that the focus of the sub-scanning cross-section shifts to the over side. That is, the first diffracting optical element 14 at this time has the action of correcting the focus shifting to the over side to the under side because the positive power thereof in the sub-scanning direction becomes strong. Thereby, the focus change of the sub-scanning cross-section when the wavelength of the light beam as the entire apparatus changes can be corrected well and any increase in the spot diameter on the photosensitive drum surface 7 can be suppressed.

Also, in the present embodiment, when the used temperature of the entire apparatus has changed to e.g. the high temperature side, the positive power of the fθ lens 16 in the sub-scanning direction becoming loose during a high temperature and the focus of the sub-scanning cross-section shifting to the over side are corrected by the optical action of the first diffracting optical element 14 by using the semiconductor laser 1 having the characteristic shown in FIG. 11. That is, the first diffracting optical element 14 at this time has the action of correcting the focus shifting to the over side to the under side because the positive power thereof in the sub-scanning direction becomes strong. Thereby, the focus change of the sub-scanning cross-section when the used temperature of the entire apparatus changes can be corrected well and any increase in the spot diameter on the photosensitive drum surface 7 can be suppressed. As described above, in the present embodiment, the focus change of the sub-scanning cross-section resulting from the environmental fluctuations of the apparatus is corrected by the use of a change in the power (refracting power) of the fθ lens 16 and the first diffracting optical element 14 in the sub-scanning direction by a change in the wavelength, and a change in the power (refracting power) of the fθ lens 16 and the first diffracting optical element 14 in the sub-scanning direction by a change in temperature.

With regard also to the main scanning cross-section, as described above, the second diffracting optical element 24 having diffracting action (power) only in the main scanning direction is added to that lens surface of the fθ lens 16 which is adjacent to the light deflector 5 and therefore, the focus change of the main scanning cross-section can also be corrected as well as that of the sub-scanning cross-section, whereby any increase in the spot diameter on the photosensitive drum surface 7 can be suppressed. As described above, in the present embodiment, the focus change of the main scanning cross-section resulting from the environmental fluctuations of the apparatus is corrected by the use of a change in the power (refracting power) of the fθ lens 16 and the second diffracting optical element 24 in the main scanning direction by a change in wavelength, and a change in the power (refracting power) of the fθ lens 16 and the second diffracting optical element 24 in the main scanning direction by a change in temperature.

Generally, when the wavelength of a light source (semiconductor laser) is changed from $\lambda_1$ to $\lambda_2$ ($\lambda_1 < \lambda_2$), for example, by a temperature change, in the prior-art scanning optical apparatus as shown in FIG. 1 which is comprised of only a refractive lens using no diffracting optical element, the power of the first optical system becomes loose and moreover, the power of the second optical system also becomes loose, and this has led to the problem that a remarkable focus change occurs as the entire scanning optical apparatus.

So, in the present embodiment, the above-noted problem is solved by making the light source capable of oscillating light beams (laser beams) of at least two different wavelengths $\lambda_1$ and $\lambda_2$, and satisfying the following condition:

$$-4.0 < \frac{\Delta P_1}{\Delta P_0 - \Delta P_1} < 0.0 \qquad (6)$$

where $\phi_1$ ... the power of the first or second diffracting optical element for the wavelength $\lambda_1$ $\Delta P_0$ ... the amount of focus change of the entire scanning optical apparatus when the wavelength of the light source means is changed from $\lambda_1$ to $\lambda_2$ $\Delta P_1$ ... the focus position difference between a case where the power of the first or second diffracting optical element is calculated by $\phi_1$ when the wavelength of the light source means is $\lambda_1$ and a case where the power of the first or second diffracting optical element is calculated by $\phi_1 \cdot (\lambda_2/\lambda_1)$ when the wavelength of the light source means is $\lambda_2$.

That is, the power of the diffracting optical element (the first or second diffracting optical element) which was $\phi_1$ in the case of the wavelength $\lambda_1$ becomes $\phi_1 \cdot (\lambda_2/\lambda_1)$ in the case of the wavelength $\lambda_2$ and therefore, in conditional expression (6), $\Delta P_1$ is a focus position difference (an amount of focus change) by only the factor of a change in the power of the diffracting optical element occurring as the result of the wavelength change from $\lambda_1$ to $\lambda_2$, and ($\Delta P_0 - \Delta P_1$) is a focus position difference (an amount of focus change) by the factor other than the factor of the change in the power of the diffracting optical element. When the power $\phi_1$ of the diffracting optical element is 0, $\Delta P_1 = 0$ and as a matter of course, the focus correcting effect by the diffracting optical element becomes entirely null. At this time, usually $\Delta P_0 \neq 0$ and therefore, $\Delta P_1/(\Delta P_0 - \Delta P_1) = 0$, when $\Delta P_1/(\Delta P_0 - \Delta P_1) = -1$, $\Delta P_0 = 0$ and as the entire scanning optical apparatus, the focus change by the wavelength fluctuation of the semiconductor laser becomes null.

Consequently, in the range of $-1 < \Delta P_1/(\Delta P_0 - \Delta P_1) < 0$, the focus correction effect by the diffracting optical element is in an under-corrected state, and in the range of $\Delta P_1/(\Delta P_0 - \Delta P_1) < -1$, the focus correction effect represents an over-corrected state. In the present embodiment, the value of this $\Delta P_1/(\Delta P_0 - \Delta P_1)$ is set so as to satisfy the above-mentioned conditional expression (6).

Conditional expression (6) is concerned with the ratio between the focus position difference by only the factor of the change in the power of the diffracting optical element and the focus position difference by the other factor than the factor of the change in the power of the diffracting optical element, and if the upper limit value of conditional expression (6) is exceeded, the focus correcting action by the diffracting optical element will become null or reverse correction will result, and this is not good. Also, if the lower limit value of conditional expression (6) is exceeded, over correction will result, and this is not good. More desirably, the lower limit value of conditional expression (6) may be $-2.0$.

Also, generally, when the used temperature of the scanning optical apparatus changes from $T_1$ to $T_2$ ($T_1 < T_2$), there has arisen the problem that in the prior-art scanning optical apparatus, the power of the lens of the optical system becomes loose or the wavelength of the light source (semiconductor laser) changes, whereby as the entire scanning optical apparatus, a remarkable focus change occurs.

So, in the present embodiment, the above-noted problem is solved by causing the light source to have the characteristic that its wavelength changes from $\lambda_1$ to $\lambda_2$ when the used temperature of the scanning optical apparatus is changed from $T_1$ to $T_2$, and satisfying the following condition:

$$-4.0 < \frac{\Delta P_{1T}}{\Delta P_{0T} - \Delta P_{1T}} < 0.0 \qquad (7)$$

where $\phi_1$ ... the power of the first or second diffracting optical element for the wavelength $\lambda_1$ $\Delta P_{0T}$ ... the amount of focus change of the entire scanning optical apparatus when the used temperature of the scanning optical apparatus is changed from $T_1$ to $T_2$ $\Delta P_{1T}$ ... the focus position difference between a case where the power of the first or second diffracting optical element is calculated by $\phi_1$ when the used temperature of the scanning optical apparatus is $T_1$ and the wavelength of the light source means is $\lambda_1$ and a case where the power of the first or second diffracting optical element is calculated by $\phi_1 \cdot (\lambda_2/\lambda_1)$ when the used temperature of the scanning optical apparatus is $T_2$ and the wavelength of the light source means is $\lambda_2$.

That is, the power of the diffracting optical element (the first or second diffracting optical element) which was $\phi_1$ in the case of the wavelength $\lambda_1$ becomes $\phi_1 \cdot (\lambda_2/\lambda_1)$ in the case of the wavelength $\lambda_2$ and therefore, in conditional expression (7), $\Delta P_{1T}$ is the focus position difference (an amount of focus change) by only the factor of a change in the power of the diffracting optical element occurring as the result of the wavelength of the light source changing from $\lambda_1$ to $\lambda_2$ when the used temperature is changed from $T_1$ to $T_2$, and ($\Delta P_{0T} - \Delta P_{1T}$) is the focus position difference (the amount of focus change) by the factor other than the factor of the change in the power of the diffracting optical element. When the power $\phi_1$ of the diffracting optical element is 0, $\Delta P_{1T} = 0$ and as a matter of course, the focus correcting effect by the diffracting optical element becomes entirely null. Also at this time, usually $\Delta P_{0T} \neq 0$ and therefore, $\Delta P_{1T}/(\Delta P_{0T} - \Delta P_{1T}) = 0$. When $\Delta P_{1T}/(\Delta P_{0T} - \Delta P_{1T}) = -1$, $\Delta P_{0T} = 0$ and as the entire scanning optical apparatus, the focus change by a change in the used temperature of the apparatus becomes null.

Consequently, in the range of $-1 < \Delta P_{1T}/(\Delta P_{0T} - \Delta P_{1T}) < 0$, the focus correcting effect by the diffracting optical element is in an under-corrected state, and in the range of $\Delta P_{1T}/(\Delta P_{0T} - \Delta P_{1T}) < -1$, the focus correcting effect represents an over-corrected state. In the present embodiment, the value of this $\Delta P_{1T}/(\Delta P_{0T} - \Delta P_{1T})$ is set so as to satisfy conditional expression (7).

Conditional expression (7) is concerned with the ratio between the focus position difference by only the factor of the change in the power of the diffracting optical element and the focus position difference by the factor other than the factor of the change in the power of the diffracting optical element, and if the upper limit value of conditional expression (7) is exceeded, the focus correcting action by the diffracting optical element will become null or reverse correction will result, which is not good. Also, if the lower limit value of conditional expression (7) is exceeded, over correction will result, which also is not good. More desirably, the lower limit value of conditional expression (2) may be −2.0.

Numerical value embodiment 4 according to the present embodiment will be shown below.

Figure 14:
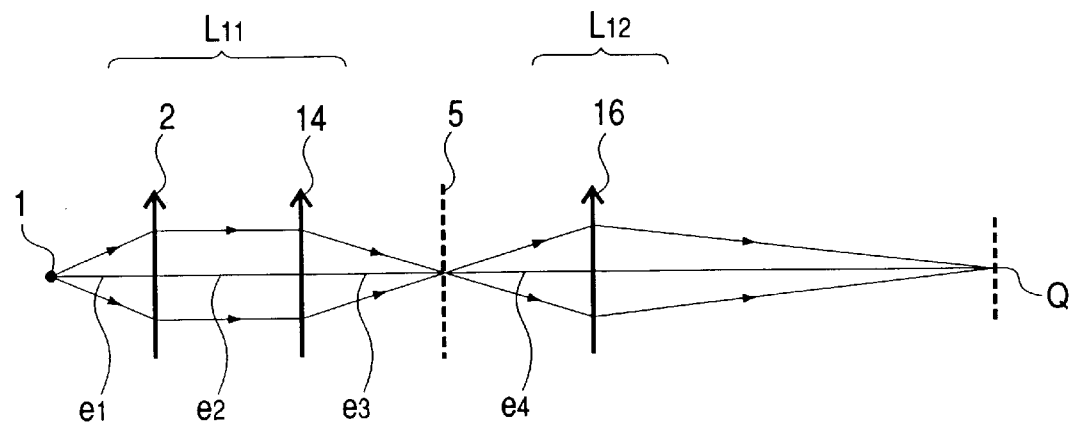
FIG. 14 is a schematic view of the essential portions showing the refractive power arrangement of Embodiment 4 of the present invention.

Numerical value embodiment 4 is such that in the construction of FIG. 10, the collimator lens 2, the first diffracting optical element 14 and the fθ lens 16 are in the refracting power arrangement of thin lenses as shown in FIG. 14, and the numerical values of only the sub-scanning cross-section are written. Numerical Value Embodiment 4

| | |
|---|---|
| laser wavelength when the temperature of the scanning optical apparatus is 25° C. | = 780 nm |
| light source 1-collimator lens 2 | interval $e_1$ = 25 |
| collimator lens 2-first diffracting optical element 14 | interval $3_2$ = 20 |
| first diffracting optical element 14-polygon mirror 5 | interval $e_3$ = 25 |
| polygon mirror 5-fθ lens 16 | interval $e_4$ = 60 |
| power of collimator lens 2 | = 0.04 |
| power of first diffracting optical element 14 | = 0.04 |
| power of fθ lens 16 | = 0.025 |
| nd and νd of collimator lens 2 | = 1.80518, 25.4 |
| nd and νd of fθ lens 16 | = 1.49171, 57.4 |
| laser wavelength when the temperature of the scanning optical apparatus is 50° C. | = 786.4 nm |
| nd and νd of fθ lens 16 when the temperature is 50° C. | = 1.48921, 57.4 |

In numerical value embodiment 4, when the temperature of the scanning optical apparatus is $T_1$=25° C., the laser wavelength is $\lambda_1$=780 nm and the focus of the sub-scanning cross-section is at a position (point Q) distant by 120 (mm) from the fθ lens 16 toward the surface 7 to be scanned.

When the temperature of the scanning optical apparatus is $T_2$=50° C., the laser wavelength becomes $\lambda_2$ =786.4 nm and the power of the collimator lens 2 weakens to 1/25.0127= 0.039980 due to color dispersion, and the power of the first diffracting optical element 14 strengthens to 0.04×(786.4/780.4)=0.040328, and the power of the fθ lens 16 weakens to 1/40.2187=0.024864 due to nd becoming as small as 1.48921 by a temperature change and due to color dispersion, and the amount of focus change $\Delta P_{0T}$ of the entire apparatus when the temperature thereof is changed from 25° C. to 50° C. is $\Delta P_{0T}$=1.208.

The focus position difference (the amount of focus change) $\Delta P_{1T}$ between a case where the power of the first diffracting optical element 14 is calculated by 0.04 when the temperature is 25° C. and the wavelength $\lambda_1$ is 780 nm and a case where the power of the first diffracting optical element 14 is calculated by 0.040328 when the temperature is 50° C. and the wavelength $\lambda_2$ is 786.4 nm is $\Delta P_{1T}$=−0.806, and $\Delta P_{1T}/(\Delta P_{0T}-\Delta P_{1T})$=−0.40.

This shows that good focus correction is effected by a change in the power of the first diffracting optical element caused by the wavelength having been changed when the temperature has been changed, and satisfies the above-mentioned conditional expression (7).

Figure 15:
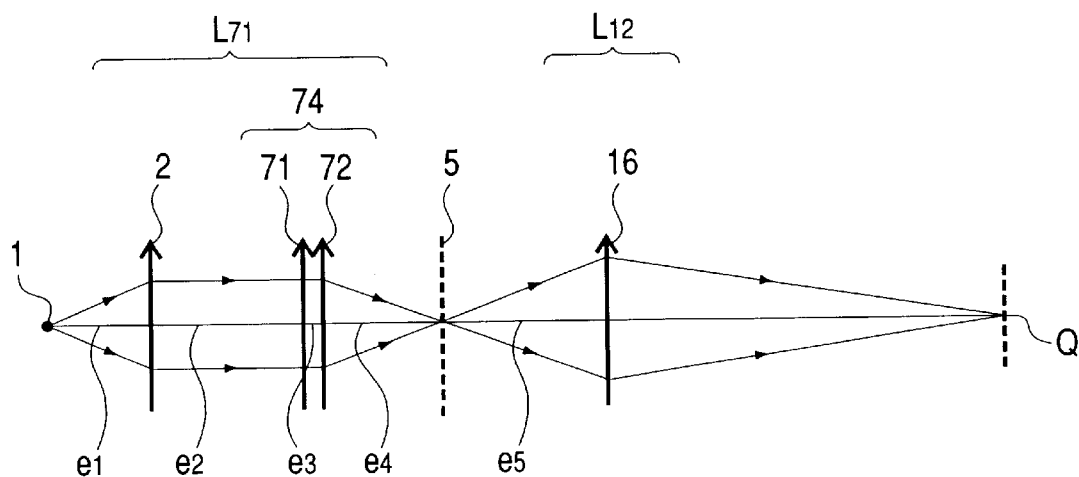
FIG. 15 is a schematic view of the essential portions showing the refractive power arrangement of Embodiment 5 of the scanning optical apparatus of the present invention.

FIG. 15 is a schematic view showing the refracting power arrangement of Embodiment 5 of the scanning optical apparatus of the present invention in the sub-scanning cross-section. In FIG. 15, the same elements as the elements shown in FIG. 14 are given the same reference numerals.

The difference of the present embodiment from the aforedescribed Embodiment 4 is that the second optical element is of a hybrid construction of a diffracting element portion (first diffracting optical element) 71 having diffracting action and a refracting lens portion (non-diffracting element lens portion) 72 having refracting action. In the other points, the construction and optical action of the present embodiment are substantially similar to those of Embodiment 4.

That is, in FIG. 15, reference numeral 74 designates a second optical element which is of a hybrid construction of the diffracting element portion (first diffracting optical element) 71 having diffracting action only in the sub-scanning direction and the refracting lens portion 72 having positive refracting power in the sub-scanning direction. By also constructing the second optical element 74 as described above, an effect similar to that of the aforedescribed Embodiment 4 can be obtained in the present embodiment.

Numerical value embodiment 5 according to Embodiment 5 will be shown below. In numerical value embodiment 5, the numerical values only in the sub-scanning cross-section are written. Numerical Value Embodiment 5

| | |
|---|---|
| laser reference wavelength | = 780 nm |
| wavelength change | = 6.4 nm |
| light source 1-collimator lens 2 | interval $e_1$ = 25 |
| collimator lens 2-diffracting element portion 71 | interval $e_2$ = 20 |
| diffracting element portion 71-refracting lens portion 72 | interval $e_3$ = 0 |
| refracting lens portion 72-polygon mirror 5 | interval $e_4$ = 25 |
| polygon mirror 5-fθ lens 16 | interval $e_5$ = 60 |
| power of collimator lens 2 | = 0.04 |
| power of diffracting element portion 71 | = 0.01 |
| power of refracting lens portion 72 | = 0.03 |
| power of fθ lens 16 | = 0.025 |
| nd and νd of collimator lens 2 | = 1.80518, 25.4 |
| nd and νd of refracting lens portion 72 | = 1.51633, 64.2 |
| nd and νd of fθ lens 16 | = 1.49171, 57.4 |

In numerical value embodiment 5, when the laser wavelength is $\lambda_1$=780 nm, the focus of the sub-scanning cross-section is at a position (point Q) distant by 120 (mm) from the fθ lens 16 toward the surface 7 to be scanned. When the laser wavelength changes to $\lambda_2$=786.4 nm, the power of each lens assumes the following value due to color dispersion:

| | |
|---|---|
| power of collimator lens 2 | = 0.039980 |
| power of refracting lens portion 72 | = 0.029992 |
| power of fθ lens 16 | = 0.024993 |

Also, the power of the diffracting element portion 71 is 0.01×(786.4/780)=0.010082. As the result, the amount of focus change $\Delta P_0$ of the entire apparatus when the wavelength changes from $\lambda_1$ to $\lambda_2$ is $\Delta P_0$=−0.031.

The focus position difference (the amount of focus change) $\Delta P_1$ between a case where the power of the diffracting element portion 71 is calculated by 0.01 when the wavelength is $\lambda_1$ and a case where the power of the diffracting element portion 71 is calculated by 0.010082 when the wavelength is $\lambda_2$ is $\Delta P_1$=−0.204, and $\Delta P_1/(\Delta P_0-\Delta P_1)$=−1.20.

This shows that when the wavelength changes, good focus correction is effected by a change in the power of the diffracting element portion 71, and satisfies the above-mentioned conditional expression (6).

In the above-described numerical value embodiments 4 and 5, the examples of numerical values in the sub-scanning cross-section have been shown, but if the diffracting action (power) of the second diffracting optical element 24 in the main scanning direction is appropriately set so as to satisfy the aforementioned conditional expressions (6) and (7) with respect also to the main scanning cross-section, focus correction can be effected well for environmental fluctuations such as temperature change and a change in the wavelength of the light source.

Figure 16:
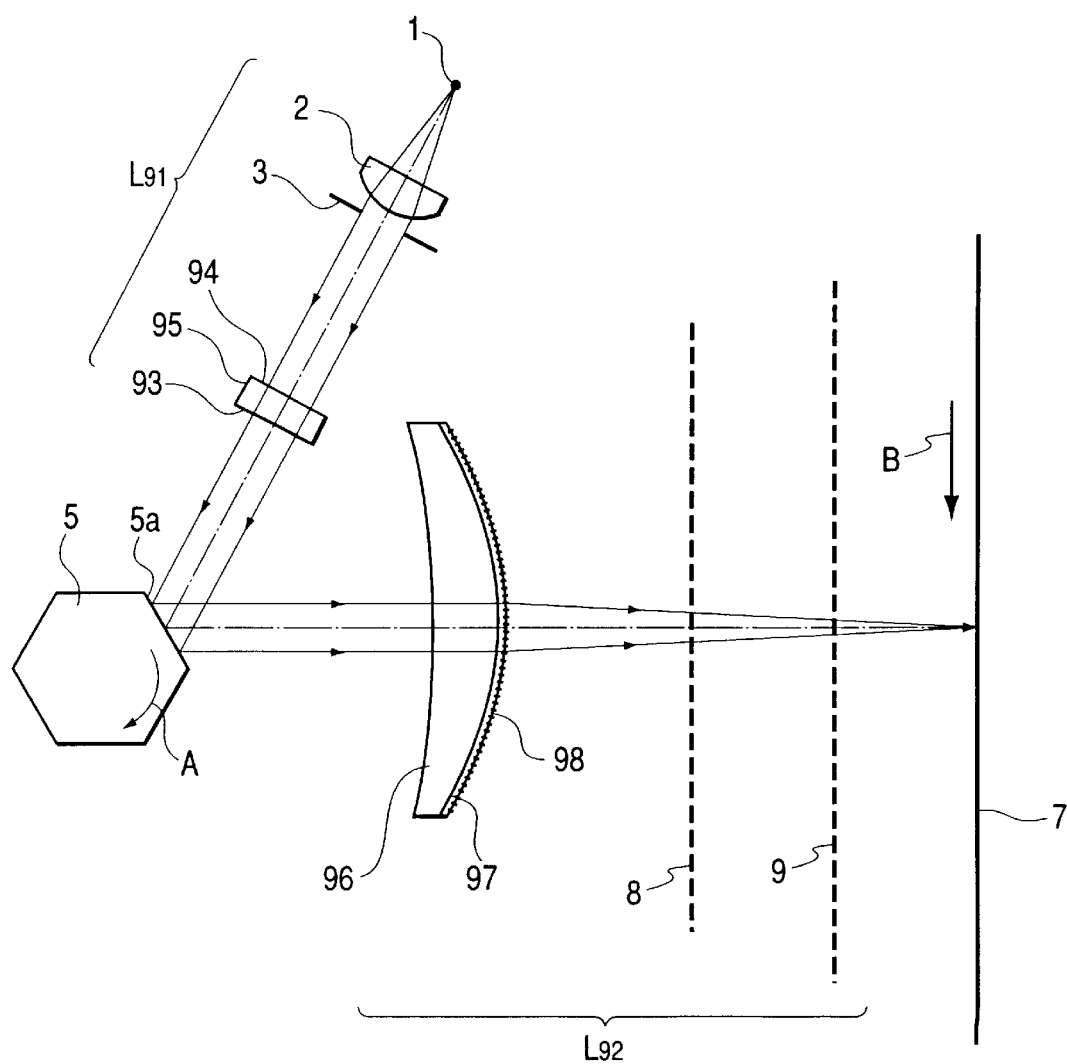
FIG. 16 is a cross-sectional view of the essential portions of Embodiment 6 of the scanning optical apparatus of the present invention in the main scanning direction.
Figure 17:
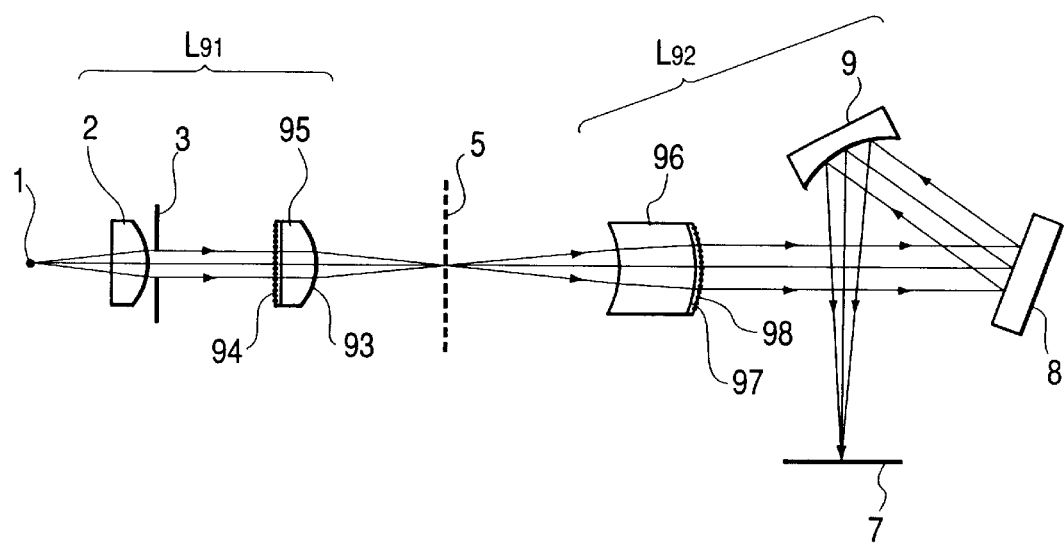
FIG. 17 is a cross-sectional view of the essential portions of Embodiment 6 of the present invention in the sub-scanning direction.

FIG. 16 is a cross-sectional view (main scanning cross-sectional view) of the essential portions of Embodiment 6 of the scanning optical apparatus of the present invention in the main scanning direction, and FIG. 17 is a cross-sectional view (sub-scanning cross-sectional view) of the essential portions of Embodiment 6 of the present invention in the sub-scanning direction. In FIGS. 16 and 17, the same elements as the elements shown in FIGS. 9 and 10 are given the same reference characters.

The differences of the present embodiment from the aforedescribed Embodiment 4 are that the second optical element is comprised of a cylindrical lens, that a diffracting optical element (first diffracting optical element) is added to one surface of the cylindrical lens and the second optical system is comprised of an fθ lens, a plane mirror and a cylindrical mirror and that a diffracting optical element (second diffracting optical element) is added to that lens surface of the fθ lens which is adjacent to the surface to be scanned. In the other points, the construction and optical action of the present embodiment are substantially similar to those of the aforedescribed Embodiment 4, whereby a similar effect is obtained.

That is, in FIGS. 16 and 17, reference numeral 95 designates a cylindrical lens (referred to also as a diffraction lens) comprising an anamorphic optical element as the second optical element, and a first diffracting element portion (first diffracting optical element) 94 having diffracting action only in the sub-scanning direction is added to that lens surface of the cylindrical lens 95 which is adjacent to the collimator lens 2. The lens surface of the cylindrical lens 95 which is adjacent to the light deflector 5 is comprised of a cylinder refracting lens portion 93 having positive power in the sub-scanning direction.

Reference numeral 96 denotes an fθ lens having the fθ characteristic which comprises an anamorphic optical element as a third optical element, and which comprises, for example, a single lens formed of a plastic material. That lens surface of the fθ lens in the present embodiment which is adjacent to the light deflector 5 is of an aspherical shape, and that lens surface of the fθ lens which is adjacent to the surface 7 to be scanned is comprised of a refracting lens portion 97 made into a rotation-symmetrical spherical surface having positive power, and a second diffracting element portion (second diffracting optical element) 98 of a rotation-symmetrical grating pattern having diffracting action only in the main scanning direction on the rotation-symmetrical spherical surface. Reference numeral 8 designates a plane mirror, and reference numeral 9 denotes a cylindrical mirror having positive refracting power in the sub-scanning direction.

In the present embodiment, a divergent light beam emitted from the semiconductor laser 1 is converted into a substantially parallel light beam in the main scanning direction by the collimator lens 2, and this light beam (the quantity of light) is limited by the aperture stop 3 and enters the cylindrical lens (first diffracting optical element 94) 95. That part of the light beam having entered the cylindrical lens 95 which is in the main scanning cross-section emerges intactly therefrom. Also, in the sub-scanning cross-section, the light beam converges and is formed substantially as a linear image (a linear image long in the main scanning direction) on the deflecting surface 5a of the light deflector 5. The light beam deflected by the deflecting surface 5a of the light deflector 5 is directed onto the photosensitive drum surface 7 by the fθ lens 96 via the plane mirror 8 and the cylindrical mirror 9, and optically scans the photosensitive drum surface 7 in the direction of arrow B by the light deflector 5 being rotated in the direction of arrow A. Thereby, image recording is effected on the photosensitive drum surface 7 which is a recording medium.

In the present embodiment, the fθ lens 96, the plane mirror 8 and the cylindrical mirror 9 together constitute an inclination correcting system for the light deflector 5, and the positive power in the sub-scanning direction is stronger than the positive power in the main scanning direction. Here, when the focus correction by a wavelength change is to be optimally effected, the positive power of the diffracting element portion in the sub-scanning direction need be made stronger because the positive power is stronger in the sub-scanning direction than in the main scanning direction. However, when the grating pattern of the second diffracting element portion 98 is made rotation-symmetrical to thereby optimize the focus correction in the main scanning direction, the focus correction in the sub-scanning direction becomes under-corrected.

So, in the present embodiment, the under-correction is compensated for by the first diffracting element portion 94 having diffracting action only in the sub-scanning direction added to that lens surface of the cylindrical lens 95 which is adjacent to the collimator lens 2, whereby as a whole, the focuses in the main scanning direction and the sub-scanning direction are corrected well.

In the present embodiment, as described above, the second diffracting element portion 98 of a rotation-symmetrical grating pattern having positive power is added to that lens surface of the fθ lens which is adjacent to the surface 7 to be scanned, whereby the first diffracting element portion 94 can be weakened in positive power and thus, is of a shape easy to manufacture.

In the present embodiment, the first diffracting element portion (diffracting optical element) is added to one surface of the cylindrical lens, but this is not restrictive. The first diffracting element portion may be added to one surface of the collimator lens.

Also, in the present embodiment, the first and second diffracting element portions are added to the surfaces of the optical elements, but this is not restrictive. They may be constructed independently in the optical path.

As described above, in each of the embodiments, the diffracting optical element is provided in each of the first optical system disposed on the light source side with respect to the light deflector and the second optical system disposed on the surface to be scanned side, whereby the optical characteristic can be singly corrected in each optical system, or the correction of the optical characteristic can be dividedly effected by each diffracting optical element and thus, more highly accurate recording of image information can be accomplished.

Also, the fact that the correction of the optical characteristic can be dividedly effected means that the grating pattern can be made simpler and realized as compared with a case where only one diffracting optical element is used and therefore, the manufacture of the diffracting optical elements can be made easy.

Also, at least one of the first diffracting optical element and the second diffracting optical element is designed to have diffracting action in one of the main scanning direction and the sub-scanning direction, whereby at least one diffracting optical element assumes a straight belt-like grating pattern only in the main scanning direction or the sub-scanning direction, and when for example, a diffracting optical element is to be manufactured by molding, the manufacture becomes possible by only the rectilinear movement of a cutting tool particularly in cutting a mold and making a grating pattern, whereby the manufacture can be made easy.

Also, one of the first diffracting optical element and the second diffracting optical element is designed to have diffracting action only in the main scanning direction and the other diffracting optical element is designed to have diffracting action only in the sub-scanning direction, whereby the grating patterns of both of the diffracting optical elements can be made into a straight belt-like shape, whereby the manufacture can be made easy, and yet the optical characteristics can be independently controlled in the main scanning direction and the sub-scanning direction.

In the present embodiment, although the manufacture becomes more or less difficult, the first and second diffracting optical elements may be designed to have diffracting action in both of the main scanning direction and the sub-scanning direction, whereby a similar effect is also obtained.

According to the present invention, as previously described, there can be achieved a scanning optical apparatus in which the diffracting optical element is provided in each of the first optical system disposed on the light source means side with respect to the light deflector and the second optical system disposed on the surface to be scanned side. In this apparatus the degree of freedom of the design of the diffracting optical elements is enhanced, and the correction of the optical characteristic can be singly effected in each optical system or the correction of the optical characteristic can be dividedly effected by each diffracting optical element. Additionally, and more highly accurate recording of image information can be effected and, the correction of the optical characteristic can be effected well by the diffracting optical element easy to manufacture with the grating pattern of the diffracting optical element made simpler.

What is claimed is:

1. A scanning optical apparatus comprising:
   a light source emitting a light beam;
   deflecting means for deflecting the light beam emitted from said light source; and
   optical means for directing the light beam emitted from said light source, and deflected by said deflecting means, onto a surface to be scanned, said optical means comprising a diffracting optical element,
   wherein an aberration fluctuation in a sub-scanning direction resulting from environmental fluctuation of said scanning optical apparatus is corrected in accordance with a characteristic of said optical means.

2. A scanning optical apparatus according to claim 1, wherein the characteristic is a relation between a power of said diffracting optical element in said optical means and a power other than that of said diffracting optical element in said optical means.

3. A scanning optical apparatus according to claim 1, wherein the characteristic is a power ratio between a diffracting portion and a refracting portion of said optical means.

4. A scanning optical apparatus according to claim 1, wherein the environmental fluctuation is a temperature fluctuation and a wavelength fluctuation of said light source.

5. A scanning optical apparatus according to claim 1, wherein said light source is a semiconductor laser.

6. A scanning optical apparatus according to claim 1, wherein the aberration fluctuation is a focus fluctuation.

7. A scanning optical apparatus according to claim 1, wherein said optical means comprises a first optical system for directing the light beam emitted from said light source to said deflecting means, and a second optical system for directing the light beam deflected by said deflecting means to the surface to be scanned, and said diffracting optical element is provided in said first optical system.

8. A scanning optical apparatus according to claim 7, wherein said diffracting optical element is provided on at least one surface of an optical element included in said first optical system.

9. A scanning optical apparatus according to claim 1, wherein said optical means comprises a first optical system for directing the light beam emitted from said light source to said deflecting means, and a second optical system for directing the light beam deflected by said deflecting means to the surface to be scanned, and said diffracting optical element is provided in said second optical system.

10. A scanning optical apparatus according to claim 9, wherein said diffracting optical element is provided on at least one surface of an optical element included in said second optical system.

11. A scanning optical apparatus according to claim 9, wherein said second optical system comprises a single lens formed of a plastic material, and said diffracting optical element.

12. A scanning optical apparatus according to claim 11, wherein said diffracting optical element is provided on at least one surface of said single lens.

13. A scanning optical apparatus according to claim 11, wherein said single lens has its opposite lens surfaces in a main scanning direction formed into an aspherical shape.

14. A scanning optical apparatus according to claim 11, wherein said single lens differs in refractive power between the main scanning direction and the sub-scanning direction.

15. A scanning optical apparatus according to claim 9, satisfying a following condition:

$$1.0 \leq \phi L/\phi B \leq 2.6,$$

where $\phi B$ is a power of the diffracting optical element in said second optical system, and $\phi L$ is a power other than that of said diffracting optical element.

16. A scanning optical apparatus according to claim 1, wherein said optical means comprises a first optical system for directing the light beam emitted from said light source to said deflecting means, and a second optical system for directing the light beam deflected by said deflecting means onto the surface to be scanned, and said diffracting optical element is provided in each of said first optical system and said second optical system.

17. A scanning optical apparatus according to claim 16, wherein said diffracting optical element is provided on at least one surface of an optical element included in said first optical system and at least one surface of an optical element included in said second optical system.

18. A scanning optical apparatus according to claim 1, wherein said diffracting optical element has a grating structure comprising a staircase-like optical element.

19. A scanning optical apparatus according to claim 1, wherein said diffracting optical element has a grating structure comprising a continuous Fresnel-like optical element.

20. An image forming apparatus comprising:
    a light source emitting a light beam;

deflecting means for deflecting the light beam emitted from said light source;

a recording medium; and optical means for directing the light beam emitted from said light source, and deflected by said deflecting means, onto a surface of said recording medium, said optical means having a diffracting optical element;

wherein an aberration fluctuation in a sub-scanning direction resulting from environmental fluctuation of said image forming apparatus is corrected in accordance with a characteristic of said optical means.

21. An image forming apparatus according to claim 20, wherein the characteristic is a relation between a power of a diffracting optical element in said optical means and a power other than that of said diffracting optical element in said optical means.

22. An image forming apparatus according to claim 20, wherein the characteristic is a power ratio between the diffracting portion and refracting portion of said optical means.

23. An image forming apparatus according to claim 20, wherein the environmental fluctuation is a temperature fluctuation and a wavelength fluctuation of said light source.

24. An image forming apparatus according to claim 20, wherein said light source is a semiconductor laser.

25. An image forming apparatus according to claim 20, wherein the aberration fluctuation is a focus fluctuation.

26. An image forming apparatus according to claim 20, wherein said optical means comprises a first optical system for directing the light beam emitted from said light source to said deflecting means, and a second optical system for directing the light beam deflected by said deflecting means onto the surface of said recording medium, and said diffracting optical element is provided in said first optical system.

27. An image forming apparatus according to claim 26, wherein said diffracting optical element is provided on at least one surface of an optical element included in said first optical system.

28. An image forming apparatus according to claim 20, wherein said optical means comprises a first optical system for directing the light beam emitted from said light source to said deflecting means, and a second optical system for directing the light beam deflected by said deflecting means onto the surface of said recording medium, and said diffracting optical element is provided in said second optical system.

29. An image forming apparatus according to claim 28, wherein said diffracting optical element is provided on at least one surface of an optical element included in said second optical system.

30. An image forming apparatus according to claim 28, wherein said second optical system comprises a single lens formed of a plastic material, and said diffracting optical element.

31. An image forming apparatus according to claim 30, wherein said diffracting optical element is provided on at least one surface of said single lens.

32. An image forming apparatus according to claim 30, wherein said single lens has its opposite lens surfaces in a main scanning direction formed into an aspherical shape.

33. An image forming apparatus according to claim 30, wherein said single lens differs in refracting power between a main scanning direction and the sub-scanning direction.

34. An image forming apparatus according to claim 28, satisfying a following condition:

$$1.0 \leq \phi L/\phi B \leq 2.6,$$

where $\phi B$ is the power of the diffracting optical element in said second optical system, and $\phi L$ is a power other than that of said diffracting optical element, and wherein said single lens has its opposite lens surfaces in a main scanning direction formed into an aspherical shape.

35. An image forming apparatus according to claim 20, wherein said optical means comprises a first optical system for directing the light beam emitted from said light source to said deflecting means, and a second optical system for directing the light beam deflected by said deflecting means onto the surface of said recording medium, and said diffracting optical element is provided in each of said first optical system and said second optical system.

36. An image forming apparatus according to claim 35, wherein said diffracting optical element is provided on at least one surface of an optical element included in said first optical system and at least one surface of an optical element included in said second optical system.

37. An image forming apparatus according to claim 20, wherein said diffracting optical element has a grating structure comprising a staircase-like optical element.

38. An image forming apparatus according to claim 20, wherein said diffracting optical element has a grating structure comprising a continuous Fresnel-like optical element.

39. A scanning optical apparatus comprising:

a light source emitting a light beam;

deflecting means for deflecting a light beam emitted from said light source;

a first optical system for directing the light beam emitted from said light source to said deflecting means, said first optical system having a first diffracting optical element; and a second optical system for directing the light beam deflected by said deflecting means onto a surface to be scanned, said second optical system having a second diffracting optical element.

40. A scanning optical apparatus according to claim 39, wherein an aberration fluctuation resulting from environmental fluctuation of said scanning optical apparatus is corrected by a characteristic of said first optical system or/and said second optical system.

41. A scanning optical apparatus according to claim 40, wherein the characteristic is a relation between a power of the diffracting optical element in said first optical system or/and said second optical system and a power other than that of said diffracting optical element in said first optical system or said second optical system.

42. A scanning optical apparatus according to claim 40, wherein the environmental fluctuation is a temperature fluctuation and the wavelength fluctuation of said light source.

43. A scanning optical apparatus according to claim 40, wherein the aberration fluctuation is a focus fluctuation.

44. A scanning optical apparatus according to claim 39, wherein said light source is a semiconductor laser.

45. A scanning optical apparatus according to claim 39, wherein said first optical system comprises an anamorphic optical system for converting the light beam emitted from said light source into a convergent light beam or a substantially parallel light beam in a main scanning direction, and causing said converted light beam to be imaged on a deflecting surface of said deflecting means in a sub-scanning direction, and said first diffracting optical element is provided on to at least one surface of an optical element included in said first optical system.

46. A scanning optical apparatus according to claim 39, wherein said second optical system comprises an anamorphic optical system for causing the light beam deflected by said deflecting means to be imaged in a spot-like shape on the surface to be scanned, and said second diffracting optical element is provided on at least one surface of an optical element included in said second optical system.

47. A scanning optical apparatus according to claim 39, wherein at least one of said first diffracting optical element and said second diffracting optical element has diffracting action only in one of a main scanning direction and a sub-scanning direction.

48. A scanning optical apparatus according to claim 39, wherein one of said first diffracting optical element and said second diffracting optical element has diffracting action only in a main scanning direction, and the other diffracting optical element has diffracting action only in a sub-scanning direction.

49. A scanning optical apparatus according to claim 39, wherein said second optical system has a single lens formed of a plastic material.

50. A scanning optical apparatus according to claim 39, wherein said first diffracting optical element is provided on at least one surface of an optical element included in said first optical system.

51. A scanning optical apparatus according to claim 39, wherein said second diffracting optical element is provided on at least one surface of an optical element included in said second optical system.

52. A scanning optical apparatus according to claim 39, wherein said first optical system and said second optical system each comprises an anamorphic optical element.

53. A scanning optical apparatus according to claim 39, wherein said light source can oscillate light beams of at least two different wavelengths $\lambda_1$ and $\lambda_2$, and satisfies a following condition:

$$-4.0 < \frac{\Delta P_1}{\Delta P_0 - \Delta P_1} < 0.0,$$

where $\phi_1$ is a power of the first or second diffracting optical element for the wavelength $\lambda_1$ $\Delta P_0$ is an amount of focus change of the entire scanning optical apparatus when the wavelength of the light source is changed from $\lambda_1$ and $\lambda_2$ $\Delta P_1$ is a focus position difference between a case where the power of the first or second diffracting optical element is calculated by $\phi_1$ when the wavelength of the light source is $\lambda_1$ and a case where the power of the first or second diffracting optical element is calculated by $\phi_1 \cdot (\lambda_2/\lambda_1)$ when the wavelength of the light source is $\lambda_2$.

54. A scanning optical apparatus according to claim 39, wherein said light source has a characteristic that the wavelength thereof changes from $\lambda_1$ to $\lambda_2$ when a temperature of the scanning optical apparatus is changed from $T_1$ to $T_2$, and satisfies a following condition:

$$-4.0 < \frac{\Delta P_{1T}}{\Delta P_{0T} - \Delta P_{1T}} < 0.0,$$

where $\phi_1$ is a power of said first or second diffracting optical element for the wavelength $\lambda_1$ $\Delta P_{0T}$ is a amount of focus change of the entire scanning optical apparatus when the temperature of the scanning optical apparatus is changed from $T_1$ to $T_2$ $\Delta P_{1T}$ is a focus position difference between a case where the power of said first or second diffracting optical element is calculated by $\phi_1$ when the temperature of the scanning optical apparatus is $T_1$ and the wavelength of the light source is $\phi_1$ and a case where said power of the first or second diffracting optical element is calculated by $\phi_1 \cdot (\lambda_2/\lambda_1)$ when the temperature of the scanning optical apparatus is $T_2$ and the wavelength of the light source is $\lambda_2$.

55. An image forming apparatus comprising:

a light source emitting a light beam;

deflecting means for deflecting the light beam emitted from said light source;

a recording medium;

a first optical system for directing the light beam emitted from said light source to said deflecting means, said first optical system having a first diffracting optical element; and a second optical system for directing the light beam deflected by said deflecting means onto a surface of said recording medium, said second optical system having a second diffracting optical element.

56. An image forming apparatus according to claim 55, wherein an aberration fluctuation resulting from environmental fluctuation of said image forming apparatus is corrected in accordance with a characteristic of said first optical system or/and said second optical system.

57. An image forming apparatus according to claim 56, wherein said characteristic is a relation between a power of the diffracting optical element in said first optical system or/and said second optical system and a power other than that of said diffracting optical element in said first optical system or/and said second optical system.

58. An image forming apparatus according to claim 56, wherein the environmental fluctuation is a temperature fluctuation and the wavelength fluctuation of said light source.

59. An image forming apparatus according to claim 56, wherein the aberration fluctuation is a focus fluctuation.

60. An image forming apparatus according to claim 55, wherein said light source is a semiconductor laser.

61. An image forming apparatus according to claim 55, wherein said first optical system comprises an anamorphic optical system for converting the light beam emitted from said light source into a convergent light beam or a substantially parallel light beam in a main scanning direction, and causing said converted light beam to be imaged on the deflecting surface of said deflecting means in a sub-scanning direction, and said first diffracting optical element is provided on at least one surface of an optical element included in said first optical system.

62. An image forming apparatus according to claim 55, wherein said second optical system comprises an anamorphic optical system for causing the light beam deflected by said deflecting means to be imaged in a spot-like shape on the surface of said recording medium, and said second diffracting optical element is provided on at least one surface of an optical element included in said second optical system.

63. An image forming apparatus according to claim 55, wherein at least one of said first diffracting optical element and said second diffracting optical element has diffracting action only in one of a main scanning direction and a sub-scanning direction.

64. An image forming apparatus according to claim 55, wherein one of said first diffracting optical element and said second diffracting optical element has diffracting action only in a main scanning direction, and the other diffracting optical element has diffracting action only in a sub-scanning direction.

65. An image forming apparatus according to claim 55, wherein said second optical system comprises a single lens formed of a plastic material.

66. An image forming apparatus according to claim 55, wherein said first diffracting optical element is provided on at least one surface of an optical element included in said first optical system.

67. An image forming apparatus according to claim 55, wherein said second diffracting optical element is provided on at least one surface of an optical element included in said second optical system.

68. An image forming apparatus according to claim 55, wherein said first optical system and said second optical system each comprises an anamorphic optical element.

69. An image forming apparatus according to claim 55, wherein said light source can oscillate light beams of at least two different wavelengths $\lambda_1$ and $\lambda_2$ and satisfies a following condition:

$$-4.0 < \frac{\Delta P_1}{\Delta P_{0T} - \Delta P_{1T}} < 0.0,$$

where $\phi_1$ is a power of said first or second diffracting optical element for the wavelength $\lambda_1$ $\Delta P_0$ is an amount of focus change of the entire image forming apparatus when the wavelength of the light source is changed from $\lambda_1$ to $\lambda_2$ $\Delta P_1$ is a focus position difference between a case where the power of said first or second diffracting optical element is calculated by $\phi_1$ when the wavelength of the light source is $\lambda_1$ and a case where the power of said first or second diffracting optical element is calculated by $\phi_1 \cdot (\lambda_2/\lambda_1)$ when the wavelength of the light source is $\lambda_2$.

70. An image forming apparatus according to claim 55, wherein said light source has a characteristic that the wavelength thereof changes from $\phi_1$ to $\lambda_2$ when a temperature of the image forming apparatus is changed from $T_1$ to $T_2$, and satisfies a following condition:

$$-4.0 < \frac{\Delta P_{1T}}{\Delta P_{0T} - \Delta P_{1T}} < 0.0,$$

where $\phi_1$ is a power of said first or second diffracting optical element for the wavelength $\lambda_1$ $\Delta P_{0T}$ is an amount of focus change of the entire image forming apparatus when the temperature of the imaging forming apparatus is changed from $T_1$ to $T_2$ $\Delta P_{1T}$ is a focus position difference between a case where the power of said first or second diffracting optical element is calculated by $\phi_1$ when the temperature of the image forming apparatus is $T_1$ and the wavelength of the light source is $\lambda_1$ and a case where the power of said first or second diffracting optical element is calculated by $\phi_1 \cdot (\lambda_2/\lambda_1)$ when the temperature of the image forming apparatus is $T_2$ and the wavelength of the light source is $\lambda_2$.

* * * * *

UNITED STATES PATENT AND TRADEMARK OFFICE
CERTIFICATE OF CORRECTION

PATENT NO. : 6,067,106
DATED : May 23, 2000
INVENTOR(S) : Yoshihiro Ishibe et al.

It is certified that error appears in the above-identified patent and that said Letters Patent is hereby corrected as shown below:

Item [56] References Cited
U.S. PATENT DOCUMENTS insert:
4,973,112   11/1990   Kramer
5,212,501   05/1993   Nakamura, et al.

FOREIGN PATENT DOCUMENTS insert:
2315 563A   02/1998   Great Britain
6-324280    11/1994   Japan
5-60997     03/1993   Japan Column 16,
Line 8, "Particularly" should read -- Particularly, --.

Column 21,
Line 45, "nd" should read -- and --.

Column 28,
Line 63, "to" should be deleted.

Column 29,
Line 17, "has" should read -- comprises --.
Line 65, "a" should read -- an --.

Column 30,
Line 5, "$\emptyset_1$" should read -- $\gamma_1$ --.

UNITED STATES PATENT AND TRADEMARK OFFICE
CERTIFICATE OF CORRECTION

PATENT NO. : 6,067,106
DATED : May 23, 2000
INVENTOR(S) : Yoshihiro Ishibe et al.

It is certified that error appears in the above-identified patent and that said Letters Patent is hereby corrected as shown below:

<u>Column 32,</u>
Line 7, "$\varnothing_1$" should read -- $\gamma_1$ --.
Line 19, "imaging" should read -- image --.

Signed and Sealed this

Eleventh Day of December, 2001

Attest:

*Nicholas P. Godici*

NICHOLAS P. GODICI
*Attesting Officer*   *Acting Director of the United States Patent and Trademark Office*